United States Patent [19]

Nakase et al.

[11] Patent Number: 5,210,663

[45] Date of Patent: May 11, 1993

[54] TRACKING CONTROL DEVICE AND MAGNETIC RECORDING AND REPRODUCING APPARATUS USING THE DEVICE

[75] Inventors: Hiromi Nakase, Osaka; Toshiyuki Kohri, Neyagawa, both of Japan

[73] Assignee: Matsushita Electric Industrial Co., Ltd., Osaka, Japan

[21] Appl. No.: 504,831

[22] Filed: Apr. 5, 1990

[30] Foreign Application Priority Data

Apr. 10, 1989 [JP] Japan .................................. 1-090129
Jun. 1, 1989 [JP] Japan .................................. 1-140490

[51] Int. Cl.$^5$ ............................................. G11B 5/592
[52] U.S. Cl. ................................. 360/77.16; 360/10.2; 360/10.3
[58] Field of Search ..................... 360/77.13–77.16, 360/78.02, 10.3, 10.1, 10.2

[56] References Cited

U.S. PATENT DOCUMENTS

| | | | |
|---|---|---|---|
| 4,141,047 | 2/1979 | Kambara et al. | 360/77.16 |
| 4,439,799 | 3/1984 | Haubrich et al. | 360/77.16 |
| 4,791,507 | 12/1988 | Doyama et al. | 360/77.15 |
| 4,933,784 | 6/1990 | Oldershaw et al. | 360/77.16 |
| 5,081,550 | 1/1992 | Yagisawa et al. | 360/78.02 |

FOREIGN PATENT DOCUMENTS 55-150129 11/1980 Japan .

*Primary Examiner*—Jerry Smith
*Assistant Examiner*—Steven R. Garland
*Attorney, Agent, or Firm*—Stevens, Davis, Miller & Mosher

[57] ABSTRACT

A tracking control device and a magnetic recording and reproducing apparatus including the tracking control device, the tracking control device comprising means for detecting track data recorded on a recording track tracking determining means for determining whether a magnetic head scans a normal recording track on the basis of the output from the track data detecting means and outputting data corresponding to a deviation of the recording track which the magnetic head scans from the normal recording track; means for calculating a deviation of an electrical-to-mechanical converter device on which the magnetic head is mounted from the output data of the tracking determining means such that the magnetic head scans a normal scanning position; and means for driving the electrical-to-mechanical converter device in accordance with the calculated output from the calculating means.

10 Claims, 24 Drawing Sheets

H-SW SIGNAL

LATCH PULSE

TRACK DATA

LATCH PULSE

TRACK DATA

CALCULATED OUTPUT LATCH PULSE

| | | TRACK DATA (C) | | | | | |
|---|---|---|---|---|---|---|---|
| | | S1 | S2 | S3 | S4 | S5 | S6 |
| TRACK DATA (e) | S1 | -a | -2a | ✕ | +2a | +a | 0 |
| | S2 | 0 | -a | -2a | ✕ | +2a | +a |
| | S3 | +a | 0 | -a | -2a | ✕ | +2a |
| | S4 | +2a | +a | 0 | -a | -2a | ✕ |
| | S5 | ✕ | +2a | +a | 0 | -a | -2a |
| | S6 | -2a | ✕ | +2a | +a | 0 | -a |

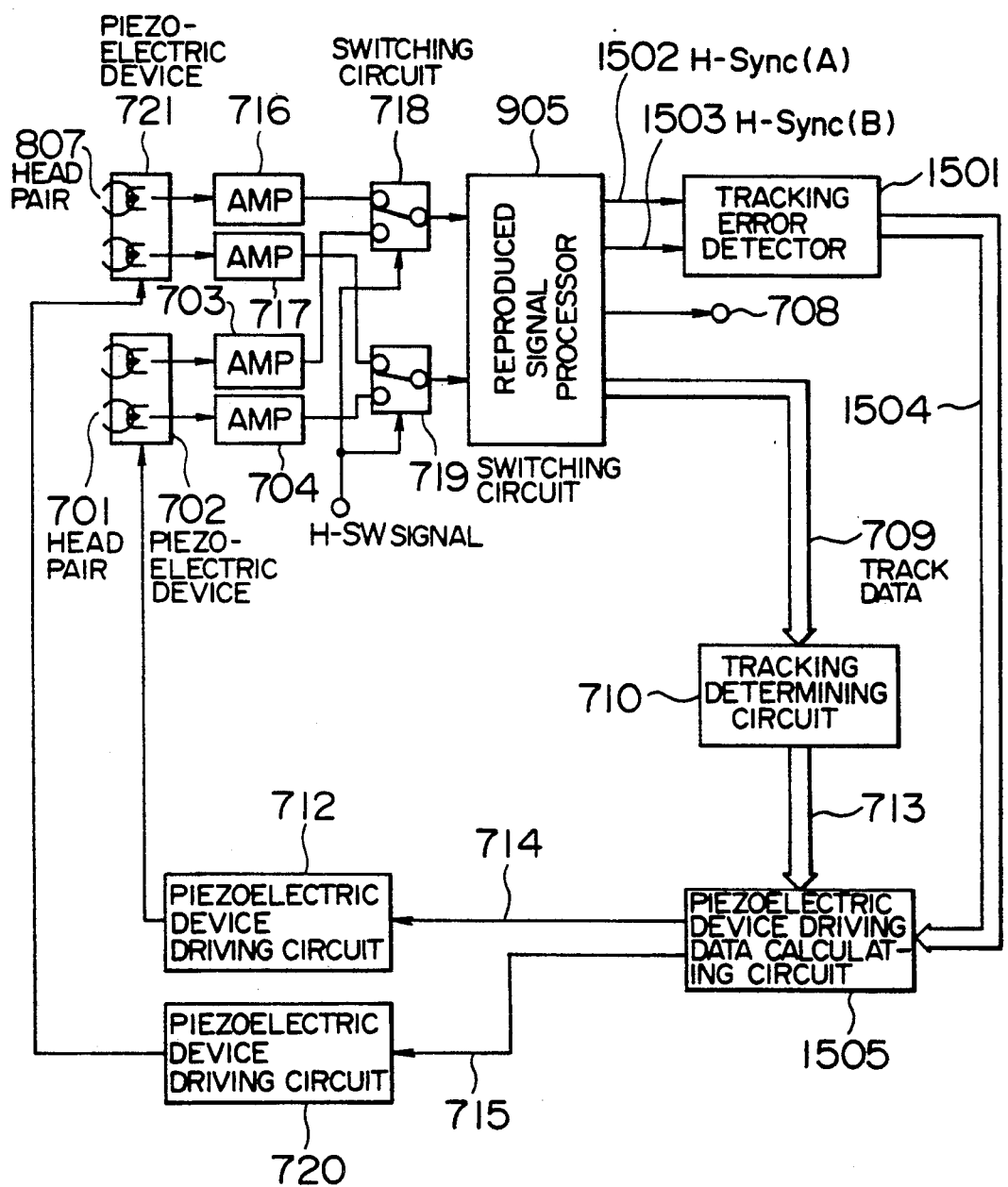
F I G. 9

F I G. 12
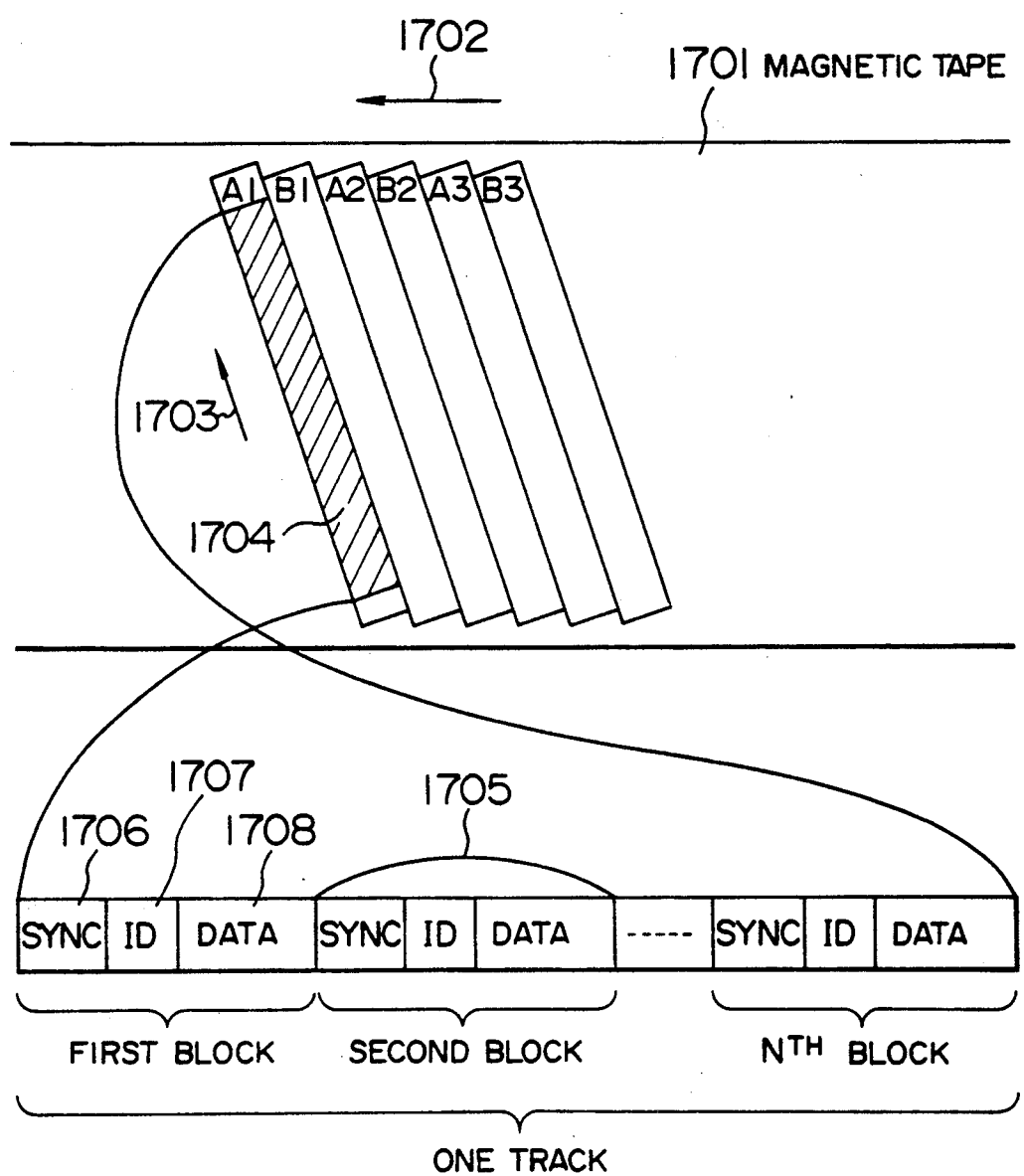

REF SIGNAL

LATCH PULSE

TRACK DATA

LATCH PULSE

TRACK DATA

CALCULATED OUTPUT PULSE

CALCULATED OUTPUT PULSE

FIG. 18

| | | | A: TRACK DATA PRECEDING CURRENT ONE BY ONE TRACK (OUTPUT 22C), REF SIGNAL = HIGH | | | | | |
|---|---|---|---|---|---|---|---|---|
| | | | S1 | S2 | S3 | S4 | S5 | S6 |
| B: TRACK DATA (OUTPUT 22e), REF SIGNAL = LOW | S1 | A | 0 | -a | -2a | +a | 0 | +a |
| | | B | +a | +a | +a | -a | -a | +a |
| | S2 | A | 0 | -a | 0 | -a | 0 | +a |
| | | B | 0 | 0 | +2a | +2a | -2a | 0 |
| | S3 | A | 0 | +a | 0 | -a | -2a | +a |
| | | B | -a | +a | +a | +a | +a | -a |
| | S4 | A | 0 | +a | 0 | -a | 0 | -a |
| | | B | -2a | 0 | 0 | 0 | +2a | +2a |
| | S5 | A | +2a | +a | 0 | +a | 0 | -a |
| | | B | -a | -a | -a | +a | +a | +a |
| | S6 | A | 0 | -a | 0 | +a | 0 | -a |
| | | B | +2a | +2a | -2a | 0 | 0 | 0 |

FIG. 21a REF 1 SIGNAL 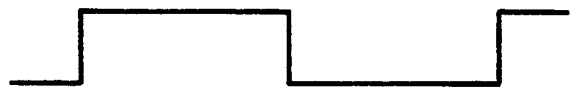
FIG. 21b REF 2 SIGNAL 
FIG. 21c SEGMENT DATA 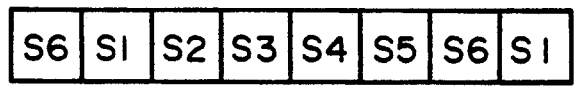
FIG. 22
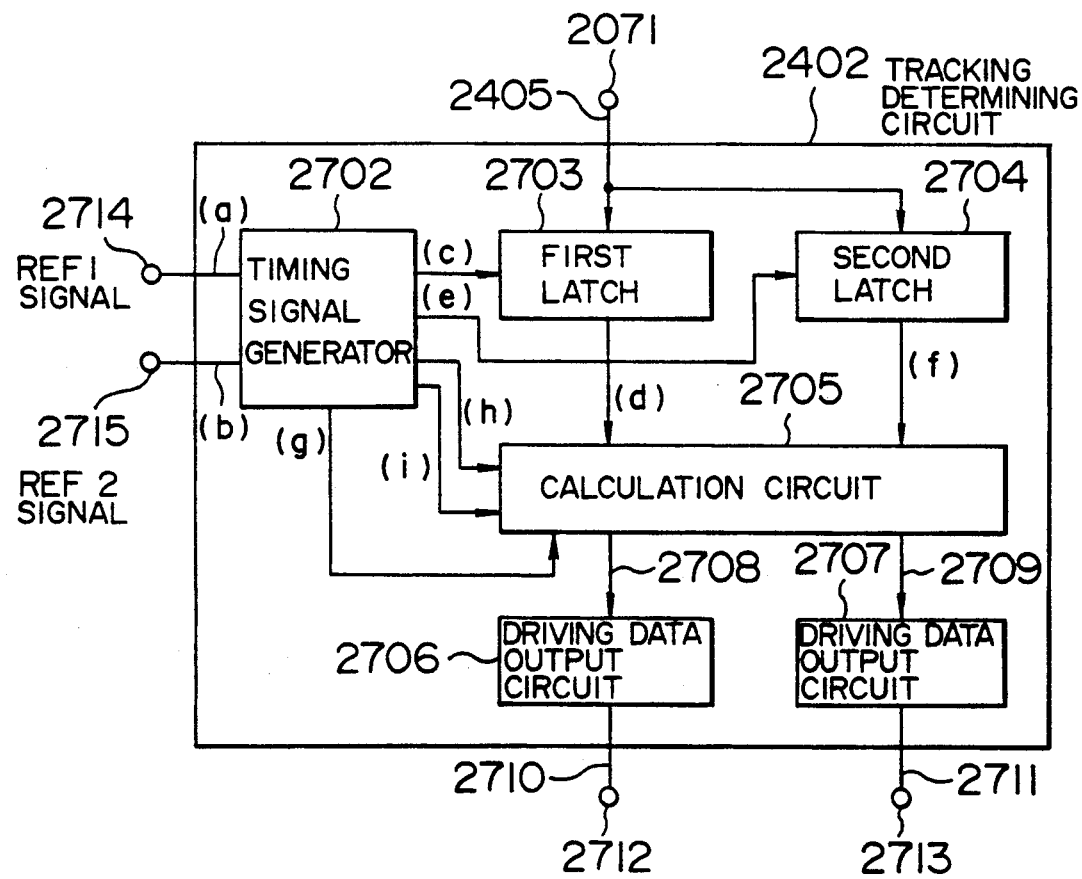

REF 1 SIGNAL — FIG. 23a
REF 2 SIGNAL — FIG. 23b
LATCH PULSE — FIG. 23c
SEGMENT DATA — FIG. 23d
LATCH PULSE — FIG. 23e
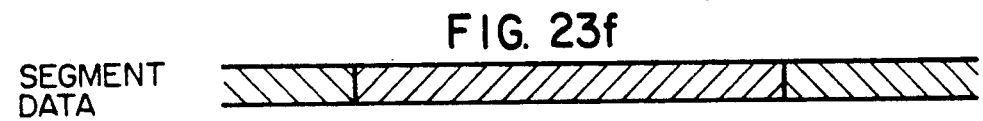
SEGMENT DATA — FIG. 23f
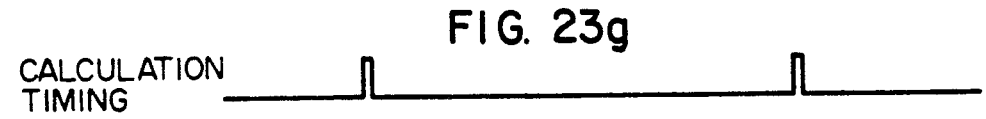
CALCULATION TIMING — FIG. 23g
OUTPUT PULSE — FIG. 23h
OUTPUT PULSE — FIG. 23i

FIG. 24

| | | | SEGMENT DATA 28d | | | | | |
|---|---|---|---|---|---|---|---|---|
| | | | S1 | S2 | S3 | S4 | S5 | S6 |
| SEGMENT DATA 28f | S1 | A | 0 | -a | -2a | ╳ | +2a | +a |
| | | B | +a | +a | +a | ╳ | +a | +a |
| | S2 | A | 0 | -a | -2a | ╳ | +2a | +a |
| | | B | 0 | 0 | 0 | ╳ | 0 | 0 |
| | S3 | A | 0 | -a | -2a | ╳ | +2a | +a |
| | | B | -a | -a | -a | ╳ | -a | -a |
| | S4 | A | 0 | -a | -2a | ╳ | +2a | +a |
| | | B | -2a | -2a | -2a | ╳ | -2a | -2a |
| | S5 | A | ╳ | ╳ | ╳ | ╳ | ╳ | ╳ |
| | | B | ╳ | ╳ | ╳ | ╳ | ╳ | ╳ |
| | S6 | A | 0 | -a | -2a | ╳ | +2a | +a |
| | | B | +2a | +2a | +2a | ╳ | +2a | +2a |

TRACKING CONTROL DEVICE AND MAGNETIC RECORDING AND REPRODUCING APPARATUS USING THE DEVICE

BACKGROUND OF THE INVENTION

1. Field of the Invention

The present invention relates to a tracking control device for a magnetic recording and reproducing apparatus.

2. Description of the Prior Art

When a magnetic recording and reproducing apparatus (hereinafter referred to as a VTR) reproduces an information signal recorded on a recording track, tracking control is required for the reproducing head to scan the track along same for reproduction.

In one practically used method of tracking control, a special-purpose control track is provided extending in the direction of extension of a tape, a control signal is recorded at a period of a frame or of an integer times the frame period when a video signal is recorded and tracking control is performed using the control signal in reproduction. However, this method has the disadvantage that it requires the special-purpose control track and that it cannot obtain a tracking error signal over the entire region of the recording track.

Another practically used method is to get a tracking error signal, for example, by detecting the difference in reproduction time between horizontal synchronizing signals output from two heads having different azimuth angles, and generally referred to as an azimuth time difference detecting system. According to this method, a tracking error signal is obtained over the entire recording track, so that if the head is mounted on an electrical-to-mechanical converter element including a piezoelectric device and the mechanical position of the head is changed using the tracking error signal, a control system which is capable of tracing a curve in the track can be constructed.

FIG. 26 illustrates a head actuator using a piezoelectric device. The actuator includes a pair of piezoelectric devices 102 and three electrodes 101 which cooperate to hold the pair of piezoelectric devices 102 such that each device is held between adjacent electrodes 101. A magnetic head 103 is attached to an end of the head actuator. When a voltage is applied across electrodes 101, the piezoelectric devices 102 are deformed and the magnetic head 103 is displaced in the directions of double-headed arrows 104.

The azimuth time difference detecting system is disclosed in Japanese Patent Publication Sho 55-150129 and uses the relationship between a track deviation in azimuth recording and the difference in reproduction time between reproduced signals. The basic concept of this method will now be described. FIG. 27 shows a magnetized track recorded by two heads different in azimuth angle. In FIG. 27, reference numeral 201 denotes a magnetic tape moved in the direction of arrow 202; 203 and 204, A and B heads different in azimuth angle and scan magnetic tape 201 simultaneously in the direction of arrow 205. Such heads which scan simultaneously and differ in azimuth angle are hereinafter referred to as a head pair. Reference numerals 206 and 207 each denote a head gap in the corresponding head; A1, A2, A3, . . . denote magnetized tracks recorded by a head having the same azimuth angle as A head 203; B1, B2, B3, . . . denote magnetized tracks recorded by a head having the same azimuth angle as B head 204. A pair of tracks A1 and B1 and a pair of tracks A2 and B2 may be recorded by the same head pair or different head pairs. That relationship is determined optionally by the rotational speed of a rotary cylinder including a rotary head and the number of head pairs provided in the design of the device. A magnetized pattern of a signal, for example, of a horizontal synchronizing signal recorded on each magnetized track is recorded at an angle or at an azimuth angle to the direction of track extension as shown by 208 and 209.

FIGS. 28(a)-(c) illustrate the positional relationship between a recorded magnetized track and a reproducing scanning head. In these Figures, reference numerals 301, 302 and 303 shown by a broken-line block denote a head pair including A and B heads. Each head pair scans in the direction of arrow 304. Reference characters A1, B1 denote magnetized tracks recorded by A and B heads, respectively. Reference numeral 305-310 denote signals which indicate the positions where the horizontal synchronizing signal is recorded. The position of the head pair deviates leftward relative to the recorded magnetized track in FIG. 28(a), is on the track in FIG. 28(b) and deviates rightward in FIG. 28(c). When the head pair having such relative positional relationship scans a recording track, even the signals recorded at the same time differ in reproduction timing. For example, in FIG. 28(a), the horizontal synchronizing signal 305 is reproduced by the A head later than when the horizontal synchronizing signal 306 is reproduced by the B head. In FIG. 28(b), the horizontal synchronizing signals are reproduced simultaneously by the A and B heads while in FIG. 28(c) the horizontal synchronizing signal 309 is reproduced by the A head earlier than when the horizontal synchronizing signal 310 is reproduced by the B head. Therefore, the tracking error can be detected by checking the difference between the moments when the horizontal synchronizing signals are reproduced by the A and B heads.

FIG. 29 is a block diagram of a tracking error detector. Horizontal synchronizing signals (H-Sync(A)) 403 and (H-Sync(B)) 404 output from the corresponding heads are input through terminals 401 and 402, respectively, to a reproduction time difference detector 405 which detects the difference in arrival time between the signals 403 and 404 and outputs a time difference signal 406 indicative of the time difference. A tracking error calculating circuit 407 outputs from a terminal 410 a tracking error signal 411 which drives a piezoelectric device so as to minimize the difference between the time difference signal 406 output from the reproduction time difference detector 405 and a tracking reference signal 409 from a terminal 408.

However, this conventional structure includes no means to detect the absolute positions of the magnetic heads mounted on the piezoelectric devices. Therefore, it cannot detect the scanning positions of the magnetic heads. In addition, the piezoelectric devices are not uniform in characteristic and the magnetic heads may be attached at different heights on the piezoelectric devices. Therefore, the voltage applied across the piezoelectric devices and the absolute positions of the magnetic heads are not in one-to-one correspondence, so that the scanning positions of the magnetic heads cannot be obtained from the voltage applied across the corresponding piezoelectric devices. It will be described in more detail with reference to FIG. 30 which schematically illustrates a tracking pattern drawn by two head pairs. A VTR is considered in which head pairs 505 and 506 mounted on the corresponding piezoelectric devices and spaced through 180 degrees on a rotary drum scan a recording track 501. During reproduction, head pair 505 scans a pair of recording tracks A1 and B1 simultaneously, head pair 506 then scans a pair of recording tracks A2 and B2 to thereby obtain a normal reproduced image whereas as shown in FIG. 30, the scanning position of head pair 506 cannot be detected even if head pair 506 scans recording tracks A3 and B3 which are not regular scanning tracks A2 and B2. Therefore, the output timing of the reproduced video signal differs from a normal one and the original image cannot be reproduced.

When head pairs 505 and 506 mounted on the corresponding piezoelectric devices scan recording track 501 for reproducing purposes, the relationship between a scanned track and a reference (REF) signal which changes high to low or vice versa in each field may be as shown in FIG. 31(b) or (c) since the scanning positions of head pairs 505 and 506 cannot be detected although the relationship shown in FIG. 31(a) is normal. Thus, the output timing of the reproduced video signal differs from a normal one and hence the original image cannot be reproduced.

SUMMARY OF THE INVENTION

It is an object of the present invention to provide a tracking control device which is capable of preventing a reproducing head from scanning a wrong recording track in accordance with track data recorded on the recording track.

The present invention provides a tracking control device comprising:

means for detecting track data recorded on a recording track;

tracking determining means for determining whether a magnetic head scans a normal recording track on the basis of the output from the track data detecting means and outputting data corresponding to a deviation of the recording track which the magnetic head scans from the normal recording track;

means for calculating a deviation of an electrical-to-mechanical converter device on which the magnetic head is mounted from the output data of the tracking determining means such that the magnetic head scans a normal scanning position; and means for driving the electrical-to-mechanical converter device in accordance with the calculated output from the calculating means.

DESCRIPTION OF THE DRAWINGS

FIG. 9 is a block diagram of a tracking control device as a second embodiment of the present invention;

FIG. 12 schematically illustrates a pattern of a recording track recorded by a magnetic recording and reproducing apparatus as a fourth embodiment of the present invention;

FIG. 18 shows an auxiliary table illustrating the operation of the tracking determining circuit of FIG. 16;

FIGS. 21(a)–(c) constitute a timing chart indicative of the operation timing of the magnetic recording and reproducing apparatus as the sixth embodiment;

FIG. 22 is a detailed block diagram of a tracking determining circuit 2402 of FIG. 19;

FIGS. 23(a)–(i) illustrates the operation timing of the tracking determining circuit of FIG. 22;

FIG. 24 shows an auxiliary table illustrating the operation of the tracking determining circuit of FIG. 23;

DETAILED DESCRIPTION OF THE PREFERRED EMBODIMENTS

Figure 1:
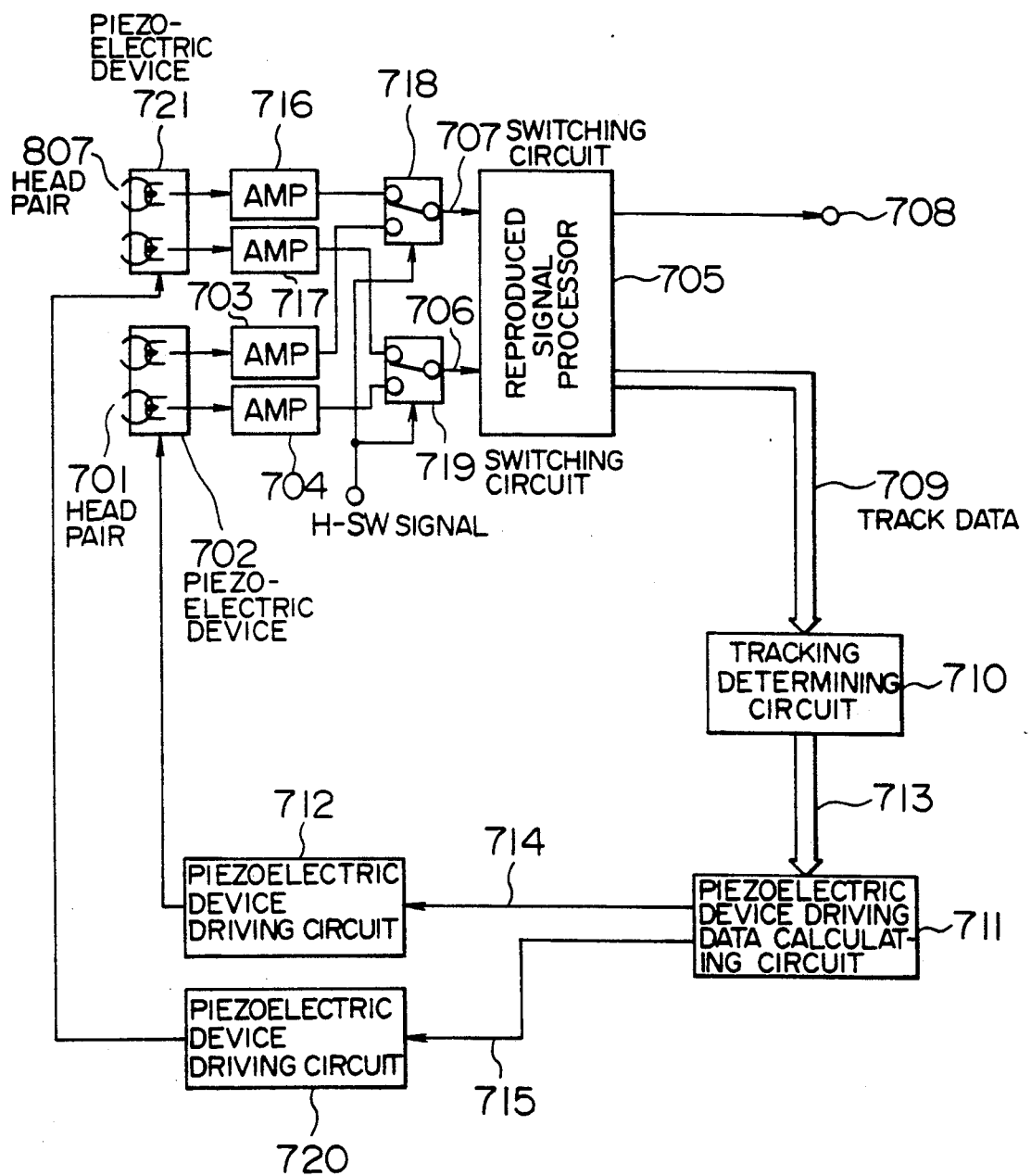
FIG. 1 is a block diagram of a tracking control device as a first embodiment of the present invention.
Figure 2:
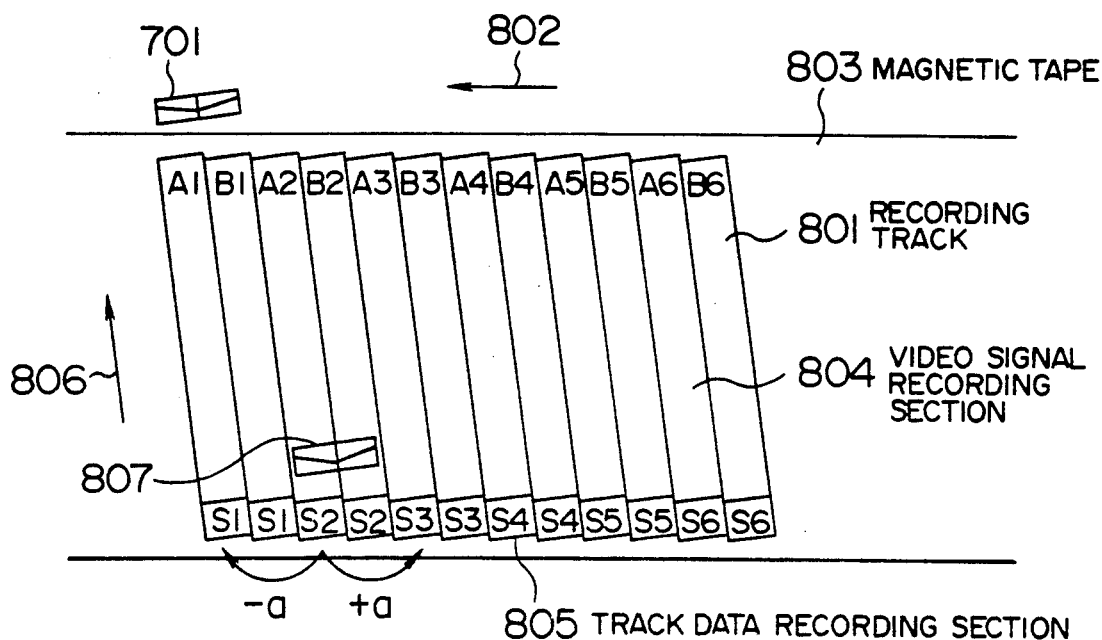
FIG. 2 schematically illustrates a pattern of a recording track recorded by a magnetic recording and reproducing apparatus including the tracking control device as the first embodiment.

Embodiments of the present invention will now be described with reference to the drawings. FIG. 1 is a block diagram of a tracking control device as a first embodiment of the present invention, and FIG. 2 schematically illustrates a recording pattern of a recording track on a magnetic tape recorded by a magnetic recording and reproducing apparatus the structure of which is not shown and including the tracking control device of FIG. 1. In FIG. 2, a magnetic tape 803 is moved in the direction of arrow 802. Head pairs 701 and 807 are mounted on corresponding electrical-to-mechanical converter devices at positions (not shown) spaced through angles of 180 degrees on a rotary drum and scanned in the direction of arrow 806. Recording track 801 includes a track data recording section 805 and a video signal recording section 804. Pieces of track data S1–S6 are recorded sequentially in pairs of recording tracks A1, B1; A2, B2; . . . A6, B6. In FIG. 1, a head pair 701 (807) is mounted on piezoelectric device 702 (721) which comprises an electrical-to-mechanical converter element. Reference numerals 703, 704 (716, 717) denote a reproduction amplifier (AMP) which amplifies a signal reproduced by head pair 701 (807). Switching circuit 719 (718) selects one of the outputs from AMPs 704 and 717 (703 and 716) in accordance with a H-SW signal indicative of the rotational position of each head of head pair 701 (807) (means for generating a H-SW signal is not shown) and outputs the selected signal as a reproduced signal 706 (707) to reproduced signal processor 705. The reproduced video signals 706, 707 are obtained by reproducing recording track 801 shown in FIG. 2 such that the track data signal recorded in the track data recording section 805 and the video signal recorded in the video signal recording section 804 are output on a time-divisional basis. Reproduced signal processor 705 demultiplexes the track data signal and the video signal output in a time-divisional multiplexed manner in which the track data signal is demodulated as track data 709 while the video signal is converted to a signal having the same form as the original signal and output from terminal 708. The magnetic recording and reproducing apparatus comprising such track control device thus constructed includes magnetic tape drive means (not shown), means for synthesizing video signals reproduced by heads 701 and 807 (not shown) and means for recording video signals (not shown), of course.

Figure 3:
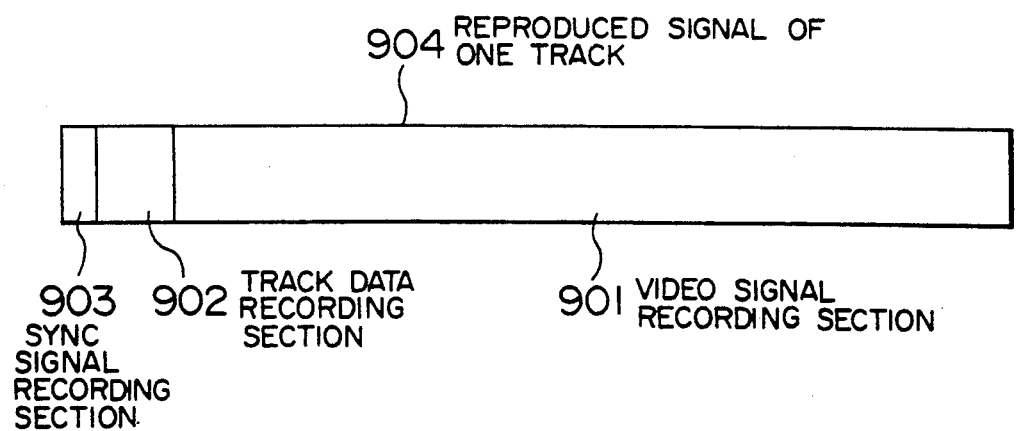
FIG. 3 schematically illustrates a detailed pattern of the recording track shown in FIG. 2.
Figure 4:
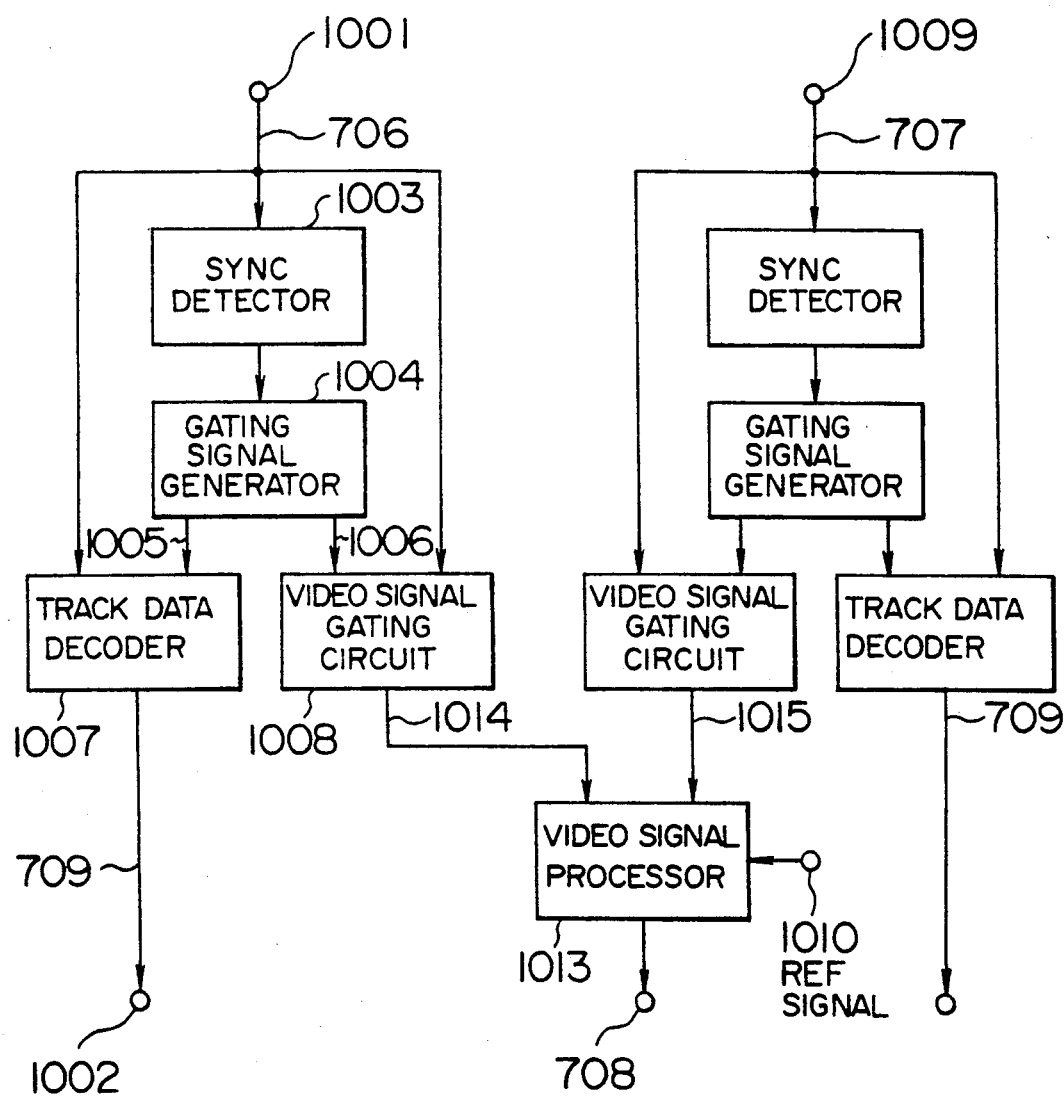
FIG. 4 is a detailed block diagram of a reproduced signal processor 705 of FIG. 1.

The operation of the reproduced signal processor 705 will now be described in detail with reference to FIGS. 3 and 4. FIG. 3 illustrates a reproduced signal per track reproduced by one head of head pair 701 (807). A reproduced signal 904 for one track includes a sync signal recording section 903 where a sync signal is recorded, a track data signal recording section 902 where a track data signal is recorded and a video signal recording section 901 where a video signal is recorded, these sections being multiplexed in a time divisional manner. FIG. 4 is a block diagram of the reproduced signal processor 705 of FIG. 1. A reproduced signal 706 is input from a terminal 1001 to a sync detector 1003 where a sync signal including a reproduced signal 706 is detected. A gating signal generator 1004 generates on the basis of the detected sync signal a track data gating signal 1005 which becomes high at the timing where the track data recording section 902 of the reproduced signal 904 for one track is reproduced and a video signal gating signal 1006 which becomes high at the timing where the video signal recording section 901 is reproduced. Track data decoder 1007 extracts only the track data signal included in the reproduced signal 706 on the basis of the track data gating signal 1005 and outputs from a terminal 1002 a reproduced track data signal as track data 709 by performing predetermined signal processing. Video signal gating circuit 1008 tracts only a video signal 1004 included in the reproduced signal 706 on the basis of the video signal gating signal 1006.

Video signal processor 1013 performs predetermined signal processing in units of a field on the basis of a video signal 1014 output from video signal gating circuit 1008 and a video signal 1015 obtained by similarly performing the output 707 from head pair 807 which receives signal from a terminal 1009 in accordance with a reference signal REF (means for generating the REF signal is not shown) from terminal 1010 to convert reproduced video signals 1014, 1015 to their original forms which are then output from terminal 708.

Figure 5:
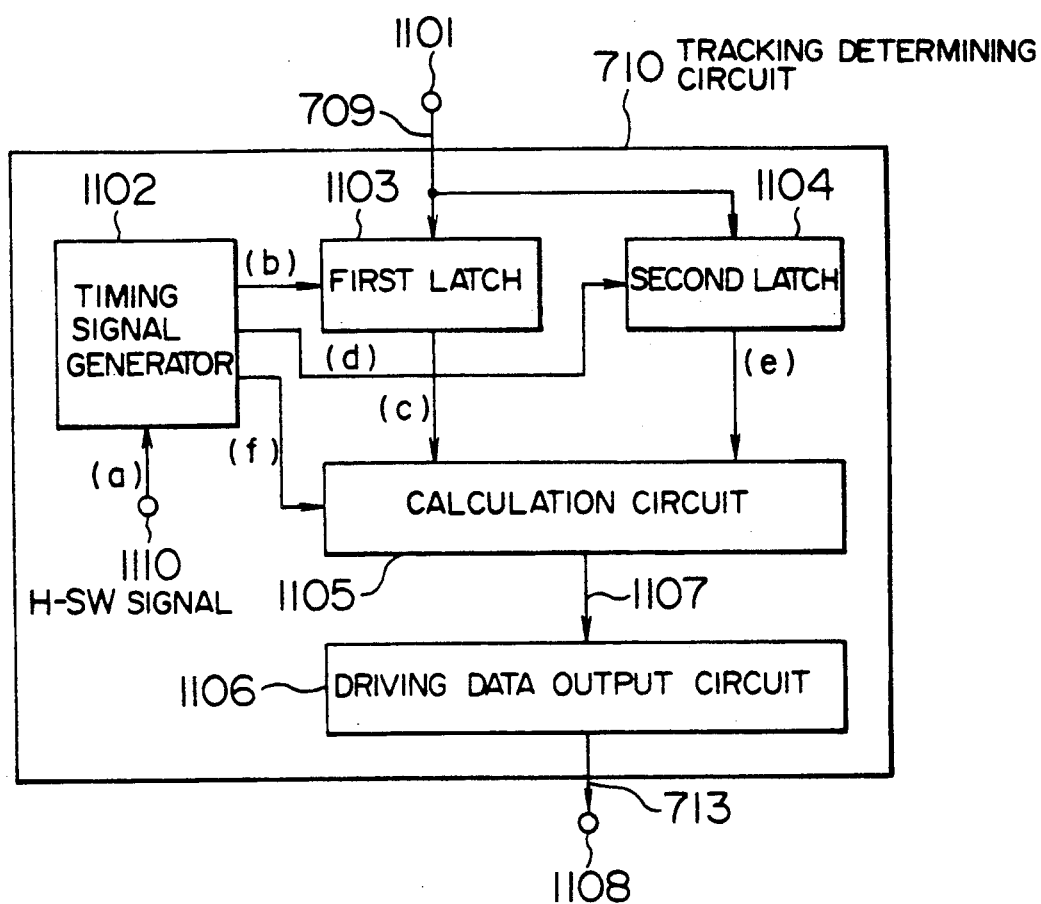
FIG. 5 is a detailed block diagram of a tracking determining circuit 710 of FIG. 1.

FIG. 5 is a block diagram illustrating one example of the structure of tracking determining circuit 710. FIGS. 6(a)–(f) show waveforms obtained from the corresponding elements of the circuit of FIG. 5. The operation of the tracking determining circuit 710 of FIG. 5 will now be described with reference to FIG. 6. In FIG. 5, track data 709 is input to terminal 1101. Track data 709 is input to first and second latches 1103 and 1104. A H-SW signal (FIG. 6(a)) which corresponds to head rotation is input to terminal 1110. Timing signal generator 1102 outputs latch pulses (FIGS. 6(b), (d)) and calculated output latch pulse (FIG. 6(f)) in accordance with the H-SW signal.

Figure 6A:
FIGS. 6(a)–(f) constitute a timing chart indicative of the operation timing of the tracking determining circuit of FIG. 5.
Figure 6B:
Figure 6C:
Figure 6D:
Figure 6E:
Figure 6F:
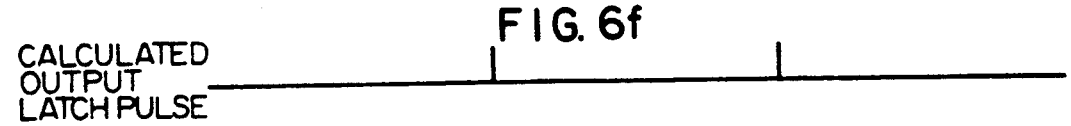
Figures 7, 8:
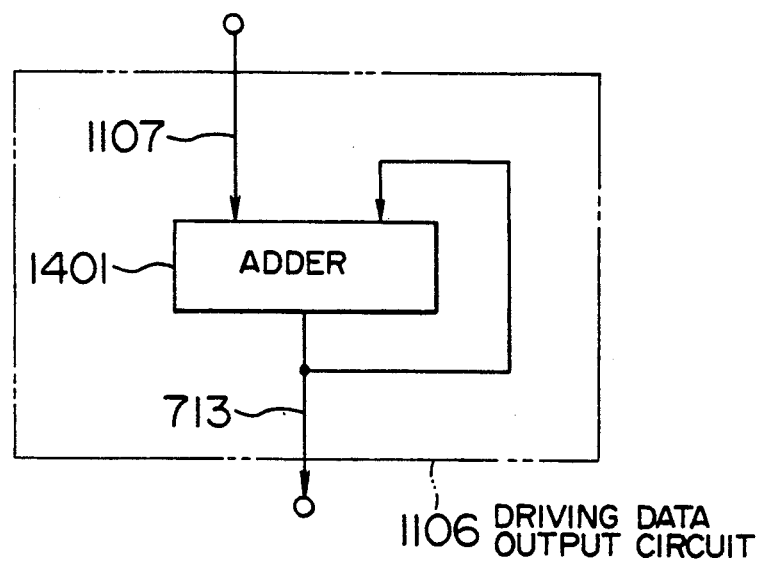
FIG. 7 is an auxiliary tab illustrating the operation of the tracking determining circuit.
FIG. 8 is a detailed block diagram of a driving data output circuit 1106 of FIG. 5.

FIG. 6(a) shows H-SW signal. When H-SW signal is high, head pair 701 scans a recording track for reproducing purposes while when H-SW signal is low, head pair 807 scans the recording track for the same purposes. (Means for generating a H-SW signal is not shown.) The latch pulse shown in FIG. 6(b) is output during the time interval when the H-SW signal is high. At this time, track data (c) output from first latch 1103 is reproduced by head 701. The latch pulse shown in FIG. 6(d) is output during the time interval when the H-SW signal is low. At this time, track data (e) output from second latch 1104 is reproduced by head 807. Track data (c), (e) output from first and second latches 1103 and 1104 are input to calculation circuit 1104 which calculates and outputs data, for example, as shown in FIG. 7, of the basis of track data (c) and (e). FIG. 6(f) denotes a calculated output latch pulse by which calculated data 1107 is output from calculation circuit 1105 to drive data output circuit 1106.

The operation of the calculation circuit 1105 will be described in more detail with reference to FIG. 7 in which the calculated data is such that error tracking quantities (correctable track deviations) for the head pairs are in the range of +4 tracks to −4 tracks on the basis of a quantity of deviation of electrical-to-mechanical converter device 702 (FIG. 1) on which head pair 701 is mounted and a quantity of deviation of the electrical-to-mechanical converter device 721 on which head pair 807 is mounted and accuracies with which magnetic heads 701 and 807 are mounted, and is the data calculated by the calculation circuit 1105 when track data is S1–S6 (FIG. 7). How to understand FIG. 7 will now be described. Track data (c) precedes track data (e) by one scan. For example, if data (e) is S4 when data (c) is S3, it can be said that the scanning positions of head pairs 701 and 807 are normal. Therefore, at this time, the result of the calculation is 0 and data 1107 output from calculation circuit 1105 is 0. However, if data (e) is S3 when data (c) is S3, the scanning position of head pair 701 deviates relatively in the forward direction of tape travelling by 2 track pitches, so that data 107 output from calculation circuit 1105 becomes (−a) to shift the scanning position of head pair 701 in the direction reverse to the direction of tape travelling. The value (−a) output from calculation circuit 1105 is data corresponding to the movement of the head pair 701 over a distance a in the direction of (−a) shown in FIG. 2 while (+a) is data corresponding to movement of the head pair 701 over a distance a in the direction of (+a). In FIG. 7, the sign X means that the scanning position of the head cannot be corrected because the deviation of a head pair is outside the allowable range of error tracking quantities. In the present embodiment, the scanning position of head pair 807 is assumed to be not changed.

FIG. 8 is a detailed block diagram of driving data output circuit 1106 of FIG. 5. Driving data output circuit 1106 includes an adder 1401 which receives data from calculation circuit 1105 and the feedback output data 713 of driving data output circuit 1106. When output data 1107 from calculation circuit 1105 is not 0, namely, when the scanning position of head pair 701 is not normal, output data 1107 from calculation circuit 1105 is newly added and new piezoelectric device driving data 713 is output to correct the scanning position of the head pair.

A further increase in the error tracking quantity can be coped with by increasing the number of pieces of track data and the number of pieces of track data (in units of a track) for an error tracking quantity G (in units of a track) is required to satisfy the following equation for the head pair:

$$T \geq G + 2$$

Piezoelectric device driving data calculating circuit 711 converts data 713, corresponding to the number of tracks by which head pair 701 (807) deviates and output from tracking determining circuit 710, to data corresponding to a deviation of piezoelectric device 702 (721) and outputs it as piezoelectric device driving data 714 (715) to piezoelectric device driving circuit 712 (720). In the present embodiment, piezoelectric device driving data 715 input to piezoelectric device driving circuit 720 does not change.

Piezoelectric device driving circuit 712 (720) applies a DC voltage corresponding to piezoelectric device driving data 714 (715) across piezoelectric device 702 (721) the deviation of which corresponds to the value of the applied DC voltage. In this case, the DC voltage applied across piezoelectric device 721 becomes 0 volts and is not changed.

For example, assume that head pair 701 deviates by two tracks (+a in FIG. 8) in the direction of tape travelling when the sensitivity of piezoelectric device 702 is 0.5 μm/v, the gain of piezoelectric device drive circuit 712 is 100 and the track pitch is 30 μm. At this time, data 713 output from tracking determining circuit 10 becomes (−a). Piezoelectric device driving data calculating circuit 711 multiplies data 713 by a constant value of 1.2/a and converts the resulting digital data to an analog one. As a result, the DC voltage 714 output from calculating circuit 711 changes by −1.2 volts. The piezoelectric device driving circuit amplifies DC voltage 714 by a factor of 100 and the voltage applied across piezoelectric device 702 changes by −120 volts. The sensitivity of piezoelectric device 702 is 0.5 μm/v, so that a deviation of device 702 is −60 μm and the scanning position of head pair 701 changes by (−a) shown in FIG. 8.

By the above structure of in the present embodiment, track data recorded on each recording track is used to determine whether the reproduction head scans along a normal track. If the head pair does not scan along the normal track, the difference between track data on a recording track to be scanned originally and reproduced track data is calculated, and the drive voltage applied across the piezoelectric device is changed by a quantity corresponding to the difference to thereby move the reproduction head onto the normal track.

A tracking control device as a second embodiment of the present invention will be described using a block diagram of FIG. 9. In FIGS. 1 and 9, like reference numerals are used to denote like functional elements of the first and second embodiments.

Figure 10:
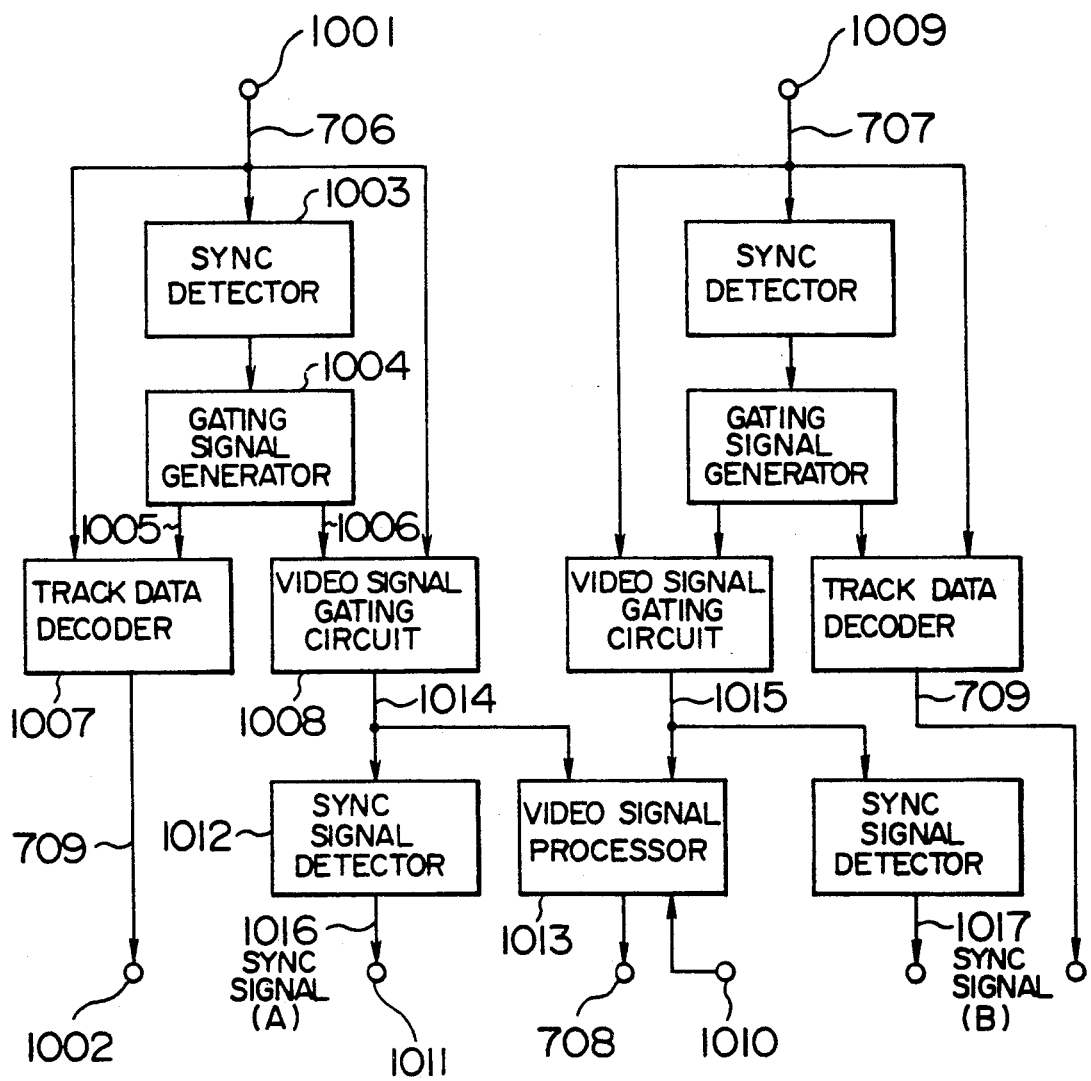
FIG. 10 is a detailed block diagram of a reproduced signal processor 905 of FIG. 9.

In FIG. 9, reproduced signal processor 905 outputs horizontal synchronizing signals 1502 (H-Sync(A)) and 1503 (H-Sync(B)) reproduced by the respective heads of head pair 701 (807) to tracking error detector 1501 which detects the difference between the times when these horizontal synchronizing signals 1502 and 1503 are reproduced and outputs tracking error data 1504 corresponding to the deviation of head pair 701 (807) from the on-track position. FIG. 10 is a block diagram of reproduced signal processor 905 of FIG. 9 which additionally includes synchronizing signal detector 1012 (FIG. 4) compared to reproduced signal processor 705 of FIGS. 1 and 4. Synchronizing signal detector 1012 detects a horizontal period signal included in video signal 1014 and outputs horizontal synchronizing signals 1502, 1503 from terminal 1011.

Piezoelectric device driving data calculating circuit 1505 calculates curve following data to cause piezoelectric device 702 (721) to shift so as to follow a track curve on the basis of tracking error data 1504, and converts data 713, corresponding to the number of tracks by which the head pair deviates and output from tracking determining circuit 710, to correcting data corresponding to the deviation of piezoelectric device 702 (721), adding the correcting data to the curve following data, and outputs the resulting data as piezoelectric device driving data 714 (715) to piezoelectric device driving circuit 712 (720).

By the above arrangement of the present embodiment, it is determined whether the reproduction head scans a normal track, by using track data recorded on the respective recording tracks. If the head does not scan the normal track, the difference between the track data of a recording track to be scanned originally and the reproduced track data is calculated, and the drive voltage applied across the piezoelectric device is changed by a quantity corresponding to the difference to thereby move the reproduction head onto the normal track. The present embodiment also realizes a tracking control device which is capable of following a track curve compared to the first embodiment.

Figure 11:
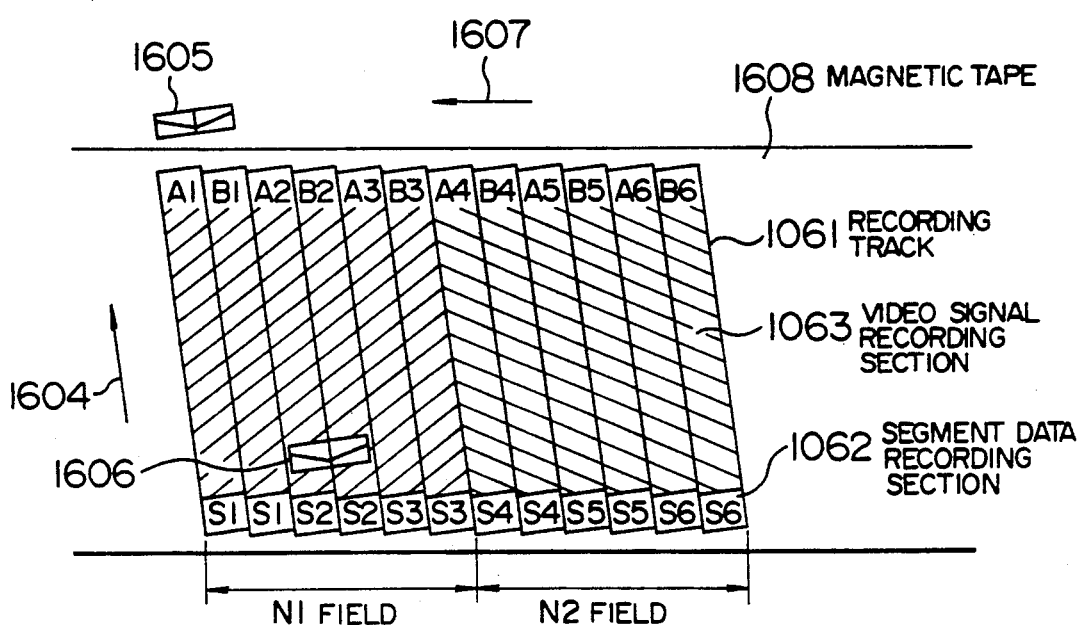
FIG. 11 schematically illustrates a pattern of a recording track recorded by a magnetic recording and reproducing apparatus as a third embodiment of the present invention.

A third embodiment of the present invention directed to a magnetic recording and reproducing apparatus the structure of which is not shown and including the tracking control device of the first embodiment will now be described with reference to FIG. 11 which schematically illustrates a record pattern of a track recorded on a magnetic tape by the apparatus. A magnetic tape 1608 is moved in the direction of arrow 1607. Head pairs 1605 and 1606 are scanned in the direction of arrow 1604. In the present embodiment, segment recording is employed in which 6 recording tracks record a one-field video signal. In FIG. 11, tracks A1, B1, A2, B2, A3 and B3 record an N1-field while tracks A4, B4, A5, B5, A6 and B6 record an N2-field. Recording track 1601 includes a segment data recording section 1602 and a video signal recording section 1603. Segment data S1–S6 are sequentially recorded corresponding to segments 1–6.

When the recording track thus recorded is to be reproduced, the segment data in the present embodiment is track data in the first embodiment. The same tracking control system as that of FIG. 1 is provided in each of head pairs 1605 and 1606 to detect segment data, for example, using a reproduced signal processor (for example, 705 in FIG. 1). Obviously, the detected data is input to and subjected to calculation in tracking determining circuit 710 to detect whether head pairs 1605 and 1606 scan normal tracks.

According to the present embodiment, it is checked whether the reproduction head scans a normal track by using a plurality of pieces of segment data into which a one-field video signal is divided and recorded on corresponding recording tracks. If the reproduction head does not scan a normal track, the difference between track data on the recording track to be scanned originally and the reproduced track data is calculated, a drive voltage applied across the piezoelectric device is changed by a quantity corresponding to the difference to move the reproduction head onto the normal track.

A fourth embodiment of the present invention directed to a magnetic recording and reproducing apparatus the structure of which is not shown and including the tracking control device of FIG. 1 will now be described with reference to FIG. 12 which schematically illustrates a recording pattern on a recording track recorded on a magnetic tape by the apparatus. A magnetic tape 1701 is moved in the direction of arrow 1702. The magnetic heads are scanned in the direction of arrow 1703. The video signal input to the magnetic recording and reproducing apparatus is converted to a digital signal which is then divided into n (an integer) blocks 1705 for each recording track 1704 and recorded on the track. Each block includes a synchronizing (Sync) signal recording section 1706, an ID data recording section 1707 and a digital video data recording section 1708. The ID data varies from block to block and from track to track (tracks A1–A3).

When the recording track recorded thus is to be reproduced, the ID data in the present embodiment corresponds to track data in the first embodiment. The ID data is detected by the reproduced signal processor 705 of FIG. 1, and the detected data value is input to tracking determining circuit 710 where calculation is performed to thereby detect whether the reproduction head scans a normal track. The present embodiment is illustrated as being directed to digital recording. It is obvious that the specific circuits of the respective elements of reproduced signal processor 705 of FIG. 4 in the first embodiment directed to analog recording are differ from those corresponding ones of the present embodiment.

The magnetic recording and reproducing apparatus of the present embodiment which records a video signal and a voice signal digitally is capable of checking whether the reproduction head scans a normal track using ID data recorded in each block. If the reproduction head does not scan the normal track, the difference between the track data of a track to be scanned originally and the reproduced track data is calculated, and the drive voltage applied across the piezoelectric device is changed by a quantity corresponding to the difference to thereby move the reproduction head onto the normal track.

Figure 14:
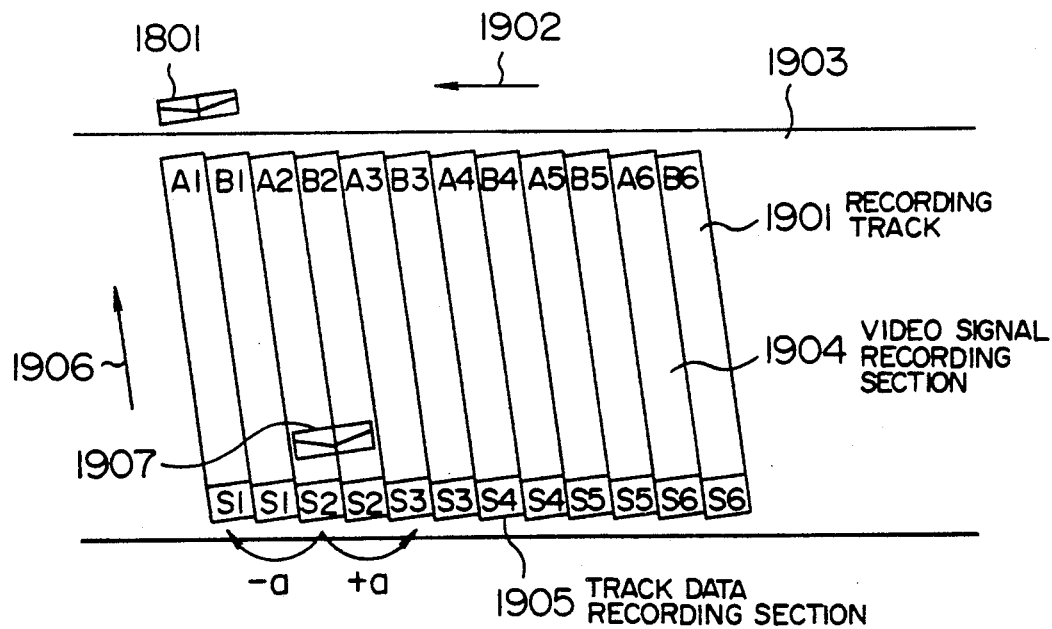
FIG. 14. schematically illustrates a recording track recorded by a magnetic recording and reproducing apparatus as a fifth embodiment of the present invention.
Figure 13:
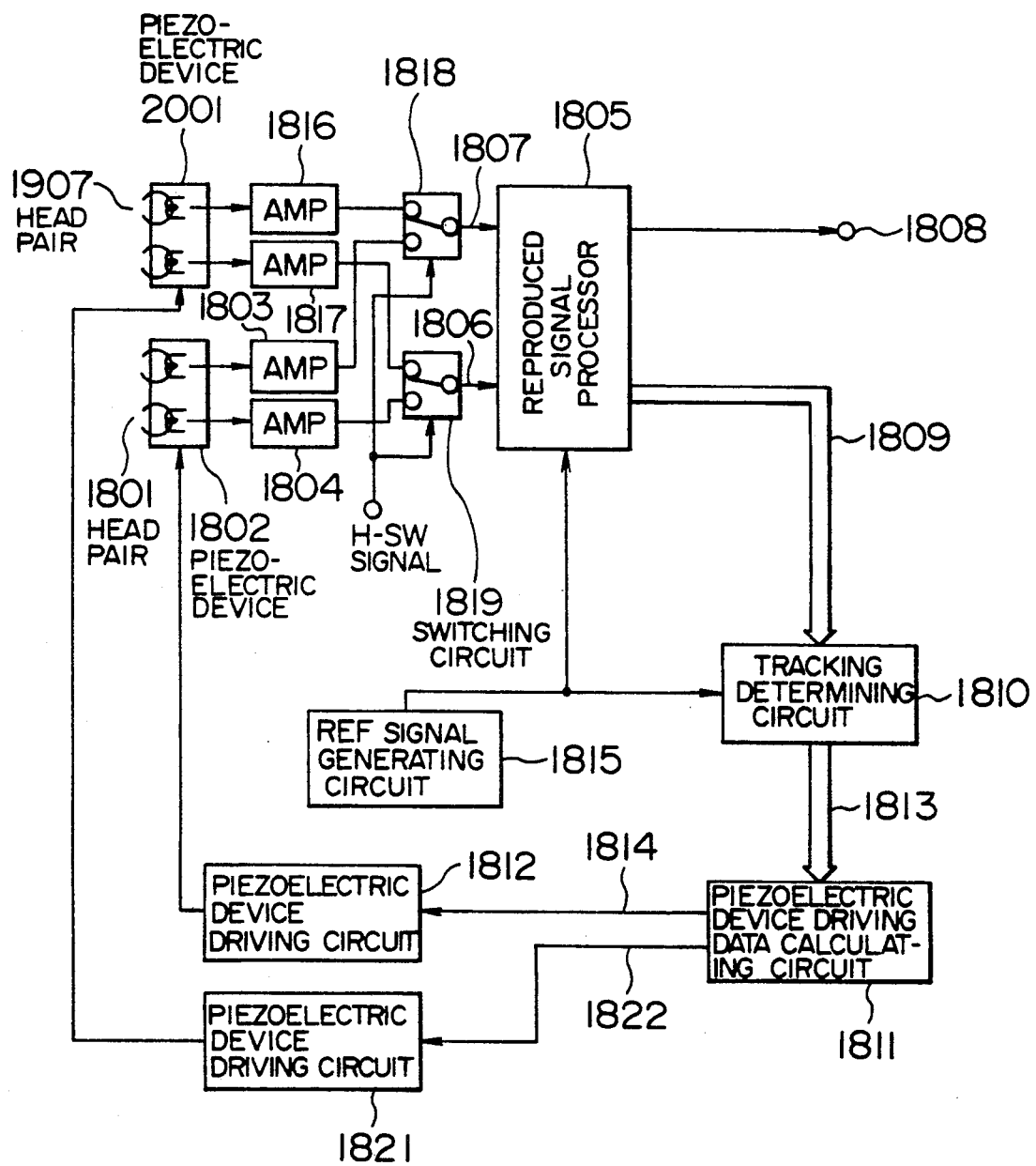
FIG. 13 is a block diagram of a tracking control device as a fifth embodiment of the present invention.

A tracking control device as a fifth embodiment of the present invention will now be described with reference to drawings in which FIG. 13 is a block diagram of the device. FIG. 14 schematically illustrates a recorded pattern on a recording track on a magnetic tape recorded by a magnetic recording and reproducing apparatus the structure of which is not shown and including the tracking control device. In FIG. 14, a magnetic tape 1903 is moved in the direction of arrow 1902. Head pairs 1801 and 1907 are mounted spaced through angles of 180 degrees on corresponding electrical-to-mechanical converter devices provided on a rotary drum and scanned in the direction of arrow 1906. A one-field video signal is recorded on a pair of recording tracks Ai and Bi (i is an integer). An odd-field video signal is recorded on pairs of recording tracks A1, B1; A3, B3; A5, B5 while an even-field video signal is recorded on pairs of tracks A2, B2; A4, B4; A6, B6. Recording track 1901 includes track data section 1905 and video signal section 1904. Track data section S1–S6 are recorded sequentially on pairs of tracks A1, B1; A2, B2; ...; A6, B6.

In FIG. 13, head pair 1801 (1907) is mounted on piezoelectric device 1802 (2001). Reference numerals 1803, 1804 (1816, 1817) denote reproduction amplifiers (AMPs) which amplify signals reproduced by head pair 1801 (1907). Reference numeral 1819 (1818) denotes a switching circuit which select one of the outputs from AMPs 1803, 1804 (1816, 1817) in accordance with a H-SW signal (means for generating same is not shown) indicative of the rotational position of head pair 1801 (1907) and outputs as a reproduced signal 1806 (1807) to reproduced signal processor 1805 which processes reproduced signal 1806 (1807) which is obtained by reproducing recording track 1901 shown in FIG. 14 and includes track data recorded on track data recording section 1905 and a video signal recorded on video signal recording section 1904 and multiplexed on a time-divisional basis. Reproduced signal processor 1805 demultiplexes the track data and video signal output multiplexed on a time-divisional basis. Namely, the track data signal is demodulated into track data 1809 while the video signal is converted to the same form as the original signal and output from terminal 1808.

The operation of reproduced signal processor 1805 is as described above with reference to FIGS. 3 and 4 in the description of the first embodiment of the present invention.

Tracking determining circuit 1810 checks whether head pair 1801 scans a normal track on the basis of the value of track data 1809 and a reference (REF) signal from REF signal generator 1815. If head pair 1801 does not scan the normal track, the determining circuit 1810 corrects driving data for the piezoelectric device and provides corrected data 1813 to piezoelectric device driving data calculating circuit 1811 such that the head pair scans the normal track.

Figure 15:
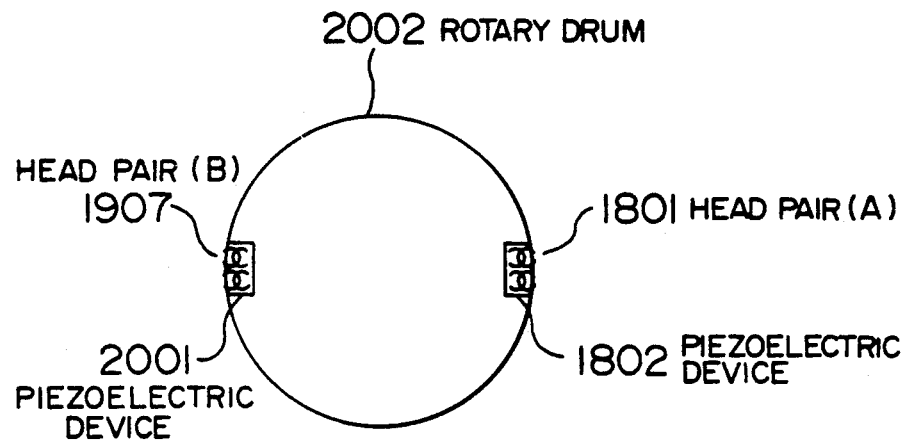
FIG. 15 is a plan view of a rotary drum.

The operation of tracking determining circuit 1810 will be described with reference to FIGS. 15 and 16. FIG. 15 illustrates the structure of rotary drum 2002. Head pairs (A) 1801 and (B) 1907 are disposed at positions spaced through 180 degrees on piezoelectric devices 1802 and 2001, respectively, on rotary drum 2002.

Figure 16:
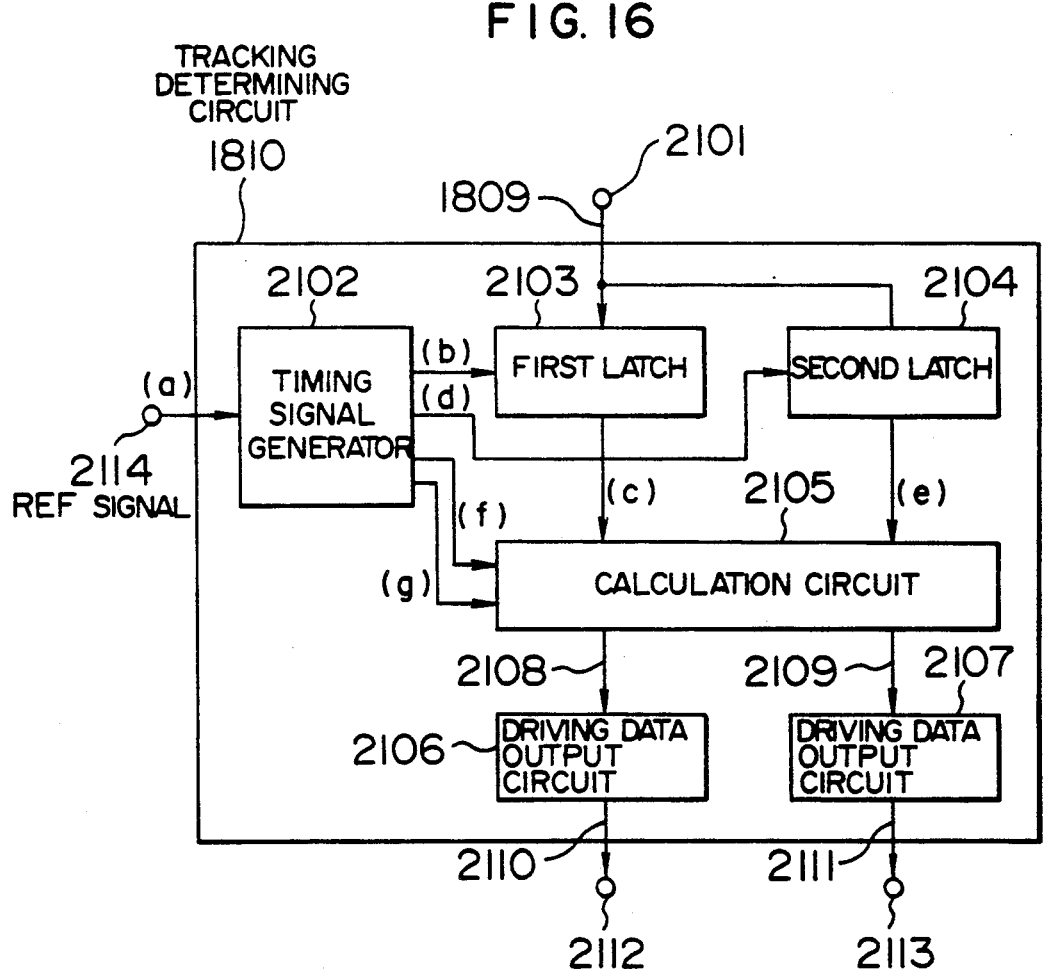
FIG. 16 is a detailed block diagram of a tracking determining circuit 1810 of FIG. 13.

FIG. 16 is a block diagram of tracking determining circuit 1810. FIGS. 17(a)–(g) illustrate the waveforms of signals obtained at the corresponding elements of the circuit of FIG. 16 in which track data 1809 is input from terminal 2101 to first and second latches 2103 and 2104.

Timing signal generator 2102 receives a reference (REF) signal (a) at a terminal 2114 and outputs latch pulses (b), (d) and calculated data output pulses (f) and (g).

Figure 17A:
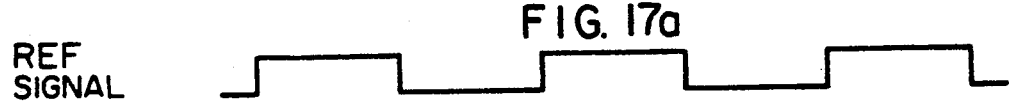
FIGS. 17(a)–(g) constitute a timing chart illustrating the operation timing of the tracking determining circuit of FIG. 16.
Figure 17B:
Figure 17C:
Figure 17D:
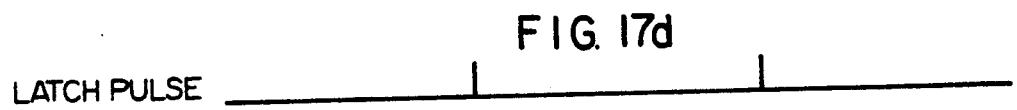
Figure 17E:
Figure 17F:
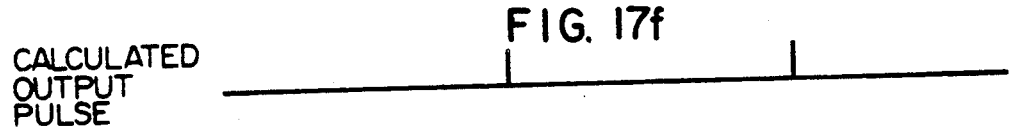
Figure 17G:

FIG. 17(a) illustrates REF signal (a). When REF signal (a) is high, head pair 1801 scans a recording track and reproduces an odd-field video signal. If REF signal (a) is low, head pair 1907 scans the recording track and reproduces an even-field video signal. As shown in FIG. 7(b), latch pulse (b) is output when the REF signal is high at which time the track data (c) from first latch 2103 is one reproduced by head pair 1801. As shown in FIG. 17(d), a latch pulse (d) is output when the REF signal is low at which time track data (e) from second latch 2104 becomes one reproduced by head pair 1907. Track data (c) and (e) output from first and second latches 2103 and 2104 are input to calculation circuit 2105 which calculates and outputs the resulting data 2108 and 2109 as shown in FIG. 18 from track data (c) and (e). FIGS. 17(f), (g) show calculated output pulses. At the timing of pulse (f), calculation circuit 2105 outputs calculated data 2108 to drive piezoelectric device 1802 while it outputs calculated data 2109 to drive piezoelectric device 2001 at the timing of pulse (g).

Referring to FIG. 18, the operation of calculation circuit 2105 will be described in more detail. Calculated data shown in FIG. 18 is obtained from calculation circuit 2105 when track data is S1-S6 and is such that error tracking quantities of head pairs 1801 and 1907 (a correctable deviation of the tracks) are in a range of +4 tracks to −4 tracks on the basis of quantities of deviation with which head pairs 1801 and 1907 are mounted on piezoelectric devices 1802 and 2001, respectively, and accuracies with which head pairs 1801 and 1907 are attached. In order to cope with a further increase in the quantity of error tracking, the number of pieces of track data T is increased which must be an even number, judging from the relationship of the REF signal to the number of pieces of track data, and is required to satisfy $$T \text{ (an even number)} \geq G+2$$

where G is a quantity of error tracking for the head pairs.

Now what is meant by FIG. 18 will be described. The upper portion (A) of each column shows data 2108 to drive piezoelectric device 1802 while the lower portion (B) of each column shows data 2109 to drive piezoelectric device 2001. Track data (c) precedes track data (e) by one scan and must be odd-field track data. Track data (e) must be even-field track data. For example, if data (e) is S4 when data (c) is S3, the scanning positions of head pairs 1801 and 1907 are normal. Therefore, the result of the calculation is 0 and data 2108 and 2109 output from calculation circuit 2105 are both 0. However, if data (e) is S3 when data (c) is S3, head pair 1801 is not required to move its scanning position while since the scanning position of head 1907 deviates relatively by two track pitches in the direction reverse to that of tape travelling, data 2109 output from calculation circuit 2105 becomes (+a) in order to move the scanning position of head pair 1907 by two track pitches in the direction of tape travelling. The value (−a) output from calculation circuit 2105 is data corresponding to the movement of the head pair in the direction of (−a) shown in FIG. 14 by a quantity of (−a) while (+a) is data corresponding to the movement of the head pair in the direction of (+a) shown in FIG. 14 by a quantity of (+a).

Piezoelectric device driving data calculating circuit 1811 converts data 1813, corresponding to the number of tracks by which head pair 1801 (1907) deviates and output from tracking determining circuit 1810, to data corresponding to a deviation of piezoelectric device 1802 (2001) and outputs the resulting data as piezoelectric device driving data 1814 (1822) to piezoelectric device driving circuit 1812 (1821).

Piezoelectric device driving circuit 1812 (1821) applies a DC voltage corresponding to piezoelectric device driving data 1814 to piezoelectric device 1802 (2001) the deviation of which corresponds to the value of DC voltage applied thereacross.

By the above arrangement of the present embodiment, calculation is performed on the basis of track data recorded on each recording track, and the REF signal for video signal processing and a motor servo to thereby check whether the reproduction head scans a normal track. If not, the difference between the track data on a recording track to be scanned originally and reproduced track data is calculated, and the drive voltage applied across the piezoelectric devices is changed by a quantity corresponding to the difference to thereby move the reproduction head to the normal track.

A sixth embodiment of the present invention directed to a tracking control device will now be described with reference to FIG. 19 which is a block diagram and FIG. 20 which schematically illustrates a recording pattern on a recording track on a magnetic tape generated by a magnetic recording and reproducing apparatus the structure of which is not shown and including the tracking control device. In FIG. 20, reference numeral 2503 denotes a magnetic tape which is moved in the direction of arrow 2502. Head pairs 1801 and 1907 are mounted on piezoelectric devices 1802 and 2001, respectively, at positions spaced through 180 degrees on a rotary drum (FIG. 15) and scanned in the arrow of 2506. In the present embodiment, segment recording is employed where a one-field video signal is divided into and recorded on six recording tracks. In FIG. 20, six tracks A1, B1, A2, B2, A, B3 record an N1-field (odd field) while six tracks A4, B4, A5, B5, A6, B6 record an N2-field (even field). Recording track 2501 includes a segment data recording section 2505 and a video signal recording section 2504. Segment data S1-S6 are recorded sequentially on the respective track pairs corresponding to segments 1-6.

Figure 19:
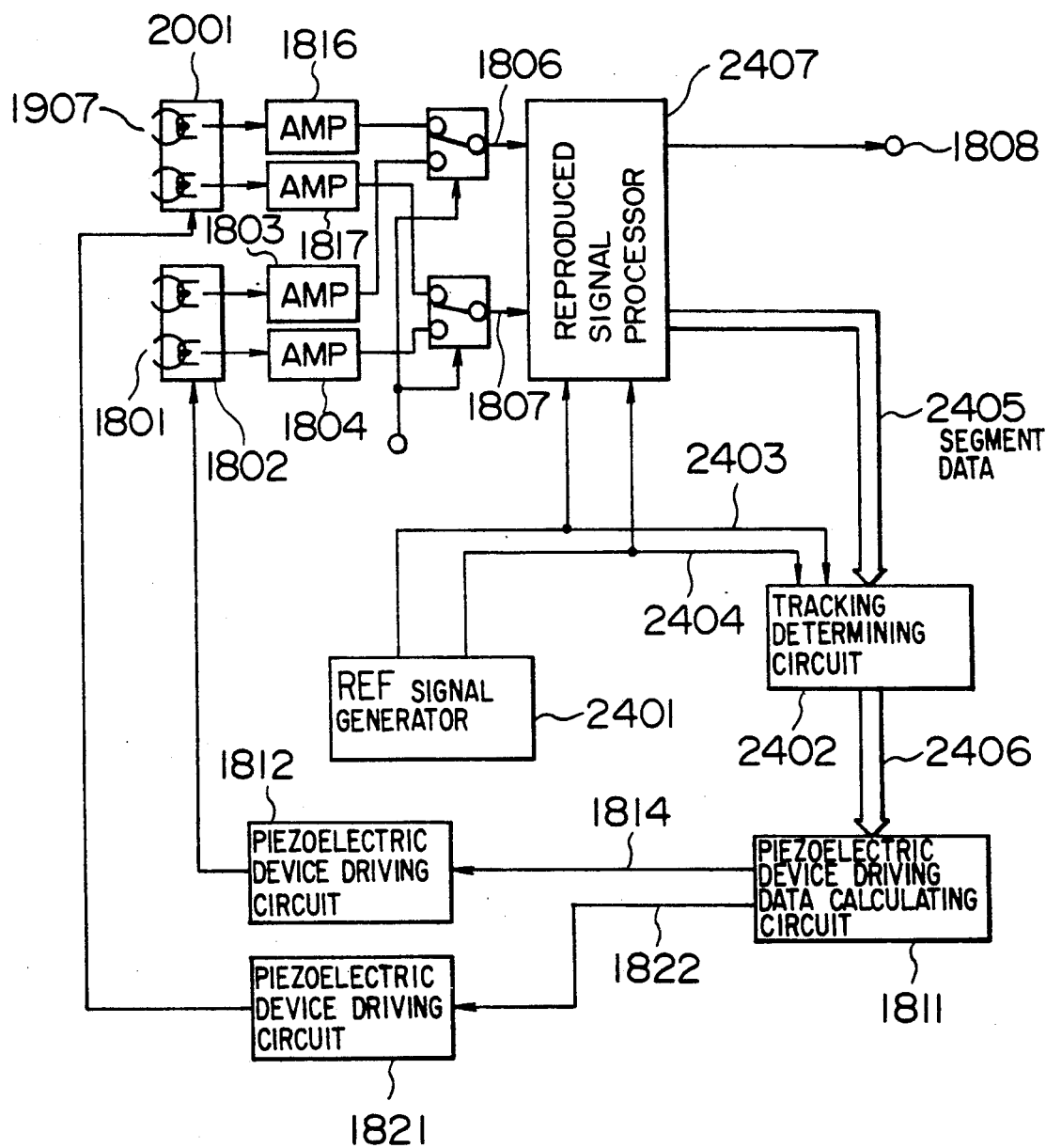
FIG. 19 is a block diagram of a tracking control device as a sixth embodiment of the present invention.
Figure 20:
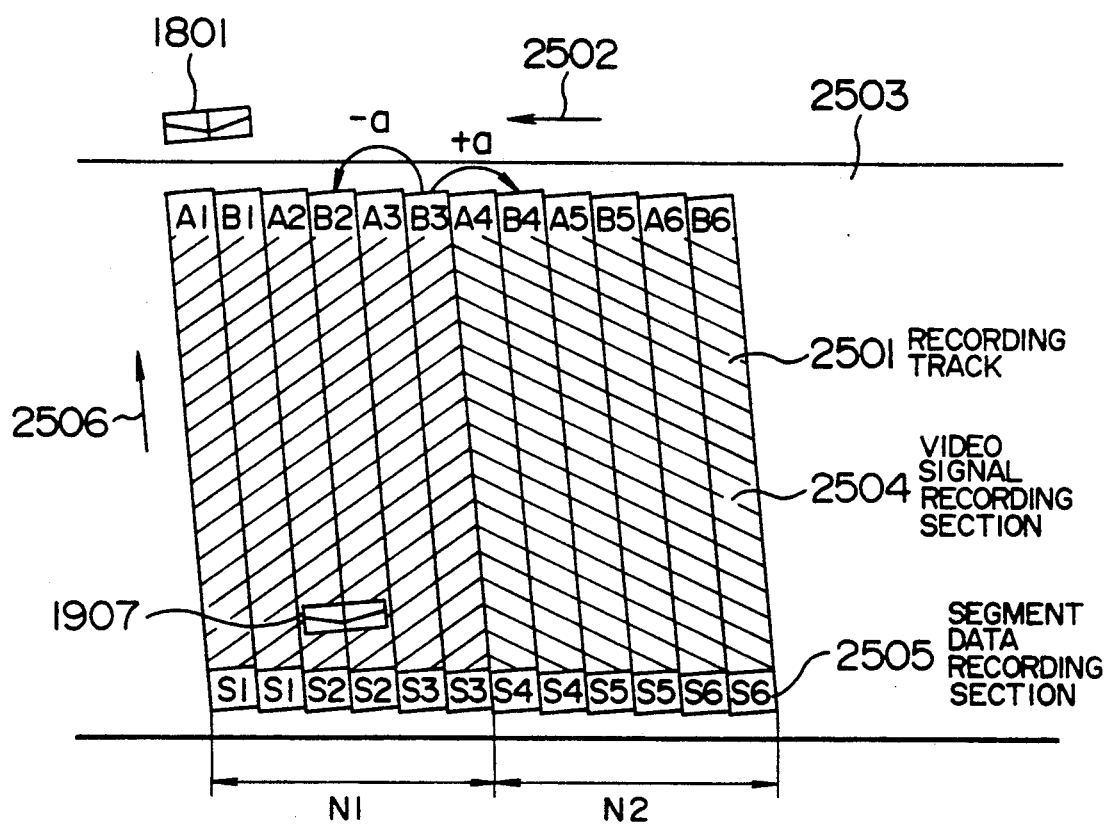
FIG. 20 schematically illustrates a pattern of a recording track recorded by a magnetic recording and reproducing apparatus including the sixth embodiment of the present invention.

In FIGS. 19 and 13, like reference numerals are used to denote like components of the sixth and fifth embodiments. The segment data signals recorded on the recording tracks corresponding to the respective segments are decoded by reproduced signal processor 2407 into segment data 2405.

Tracking determining circuit 2402 checks whether head pairs 1801, 1907 scan normal tracks on the basis of the value of segment data 2405 and two kinds of reference signals (REF1, REF2) output from REF signal generator 2401. If not, determining circuit 2402 corrects drive data for piezoelectric device 1802 (12001) and outputs correction data to piezoelectric device driving data calculating circuit 1811 such that the heads scan normal tracks.

The operation of tracking determining circuit 2402 will be described with reference to FIGS. 21, 22 and 23. FIG. 21 illustrates the relationship between reference signals REF1, REF2 and segment data. REF1 signal 2404 is of 30 Hz and illustrates the switching of a field while REF2 signal 2403 is of 90 Hz and shows the switching of a segment. When REF2 signal is high, head pair 1801 scans a recording track for reproducing purposes while when REF2 signal is low, head pair 1907 scans a recording track for the same purposes.

FIG. 22 is a block diagram indicative of one example of tracking determining circuit 2402.

FIGS. 23(a)-(i) illustrate the waveforms of signals from the corresponding elements of circuit 2402 of FIG. 22. In FIG. 22, segment data 2405 is input from terminal 2701 to first and second latches 2703 and 2704. Terminals 2714 and 2715 receive REF1 and REF2 signals (a) and (b), respectively. Timing signal generator 2702 outputs latch pulses (c), (e), calculation timing pulse (g) and calculated output pulses (h), (i) on the basis of the REF1 and REF2 signals. FIG. 23 (a) illustrates REF1 signal, and FIG. 23 (b) illustrates REF2 signal. The relationship between REF1 signal, REF2 signal and segment data is as described in FIG. 21. Latch pulse (c) is output during the interval of segment 1 (REF2 is high) as shown in FIG. 23(c). Latch pulse (e) is output during the interval of segment 2 (REF2 is low) as shown in FIG. 23(e). At this time, segment data (d) output from first latch 2703 is reproduced by head pair 1801 at the timing of segment 1. Segment data (f) output from second latch 2704 is reproduced by head pair 1907 at the timing of segment 2. Segment data (d) and (f) output from first and second latches 2703 and 2704 are input to calculation circuit 2705 which performs a calculating operation on the segment data (d) and (f) and outputs calculated data 2708 and 2709 as shown in FIG. 24. FIG. 23(g) shows a calculation timing pulse to perform a tracking determining operation when the calculation timing pulse (g) is high in calculation circuit 2705. FIGS. 23(h), (i) show calculated output pulses. At the timing of calculation output pulse (h), calculated data 2708 to drive piezoelectric device 1802 is output from calculation circuit 2705 while at the timing of calculated output pulse (i), calculated data 2709 such as, for example, shown in FIG. 24, to drive piezoelectric device 2001 is output from calculation circuit 2705. Drive data output circuits 2706, 2707 add or subtract calculated data 2708, 2709 to or from piezoelectric device driving data 2710, 2711 output from terminals 2712, 2713 and output then as new piezoelectric driving data 2710, 2711 to terminals 2712, 2713, respectively.

Referring to FIG. 24, the operation of calculation circuit 2705 will be described in more detail. Calculated data shown in FIG. 24 is obtained from calculation circuit 2705 when track data is S1–S6 and is such that error tracking quantities of head pairs 1801 and 1907 (a correctable deviation of the tracks) are in a range of +4 tracks to −4 tracks on the basis of quantities of deviation with which head pairs 1801 and 1907 are mounted on piezoelectric devices 1802 and 2001, respectively, and accuracies with which head pairs 1801 and 1907 are attached. In order to cope with a further increase in the quantity of error tracking, the number of pieces of track data T is increased. The number of pieces of track data T is required to satisfy $$T \geq G + 2$$

where G is a quantity of error tracking (track) for the head pairs.

Now what is meant by FIG. 24 will be described. The upper portion (A) of each column shows data 2708 to drive piezoelectric device 1802 while the lower portion (B) of each column shows data 2709 to drive piezoelectric device 2001. Since segment data (d) must be reproduced at the timing of segment 1, the segment data obtained by normal head scanning is S1. Since segment data (f) must be reproduced at the timing of segment 2, the segment data obtained by normal head scanning is S2. Thus, data 2708 output from calculation circuit 2705 is the difference between the value of segment data (d) and segment data S1 while data 2709 from calculation circuit 2705 is the difference between the value of segment data (f) and segment data S2. For example, if data (d) is S1 and data (f) is S2, the scanning positions of head pairs 1801, 1907 are normal. Therefore, data 2708, 2709 output from calculation circuit 2705 are both 0. However, for example, if data (d) is S1 and data (f) is S3, the scanning position of head pair 1801 is normal and data 2708 output from calculation circuit 2705 is 0. However, since the scanning position of head pair 1907 deviates by two track pitches in the direction of tape travelling, data 2709 output from calculation circuit 2705 becomes (−a) in order to cause the scanning position of head pair 1907 to deviate by two track pitches in the direction reverse to that of tape travelling.

The value (−a) output from calculation circuit 2705 is data corresponding to the movement of the head over a distance of (−a) in the direction of (−a) shown in FIG. 20 while (+a) is data corresponding to the movement of the head over a distance of (+a) in the direction of (+a) shown in FIG. 20. In FIG. 24, the sign X denotes that the deviation of the head is outside the range of error tracking quantities and cannot be corrected.

By the structure of the present embodiment, it is checked whether the reproduction head scans a normal track by using the values of a plurality of pieces of segment data into which a one-field video signal is divided and recorded on corresponding recording tracks in a segment recording manner, a reference signal as a reference of video signal processing and a track scan switching signal. If the reproduction head does not scan the normal track, the difference between the value of segment data on a recording track to be scanned originally and the value of reproduced segment data is calculated and the drive voltage applied across the piezoelectric device is changed by a quantity corresponding to the value of the difference to thereby move the reproduction head to the normal track.

Figure 25:
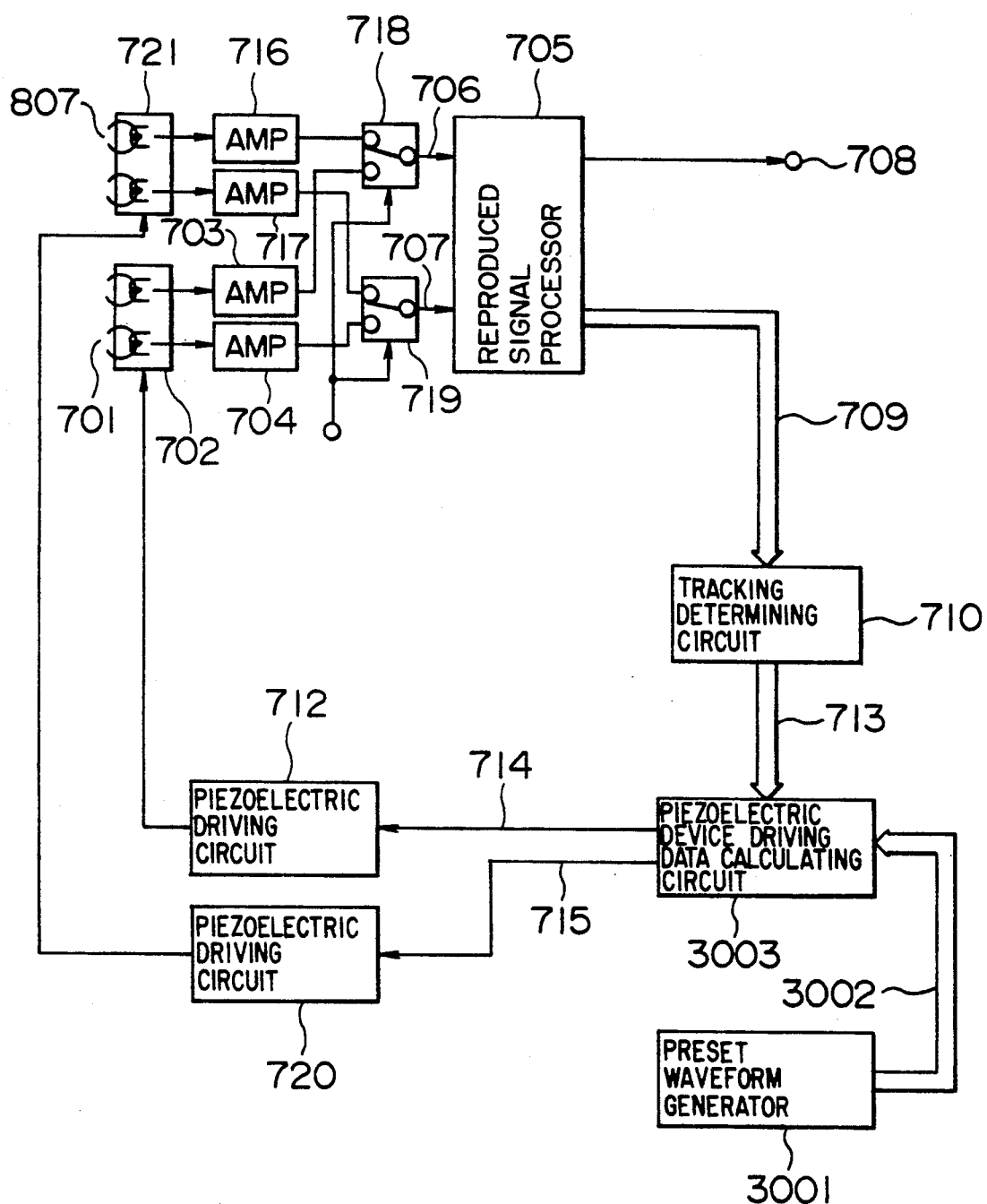
FIG. 25 is a block diagram of a tracking control device as a seventh embodiment of the present invention.
Figure 26:
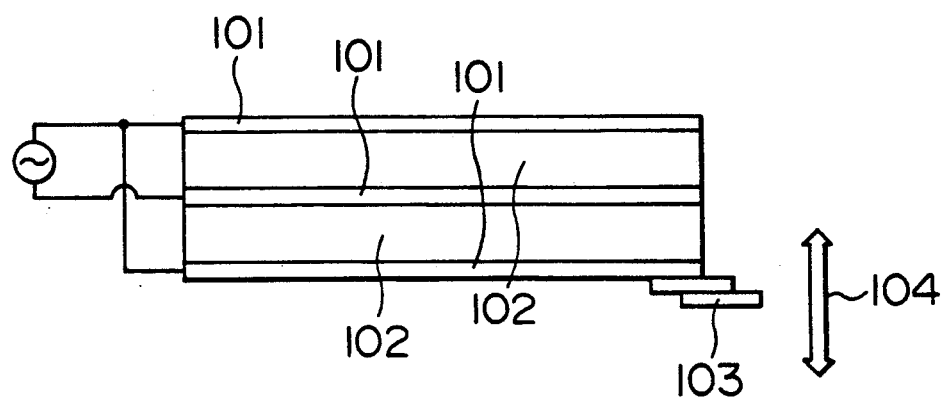
FIG. 26 is a plan view of a head actuator.
Figure 27:
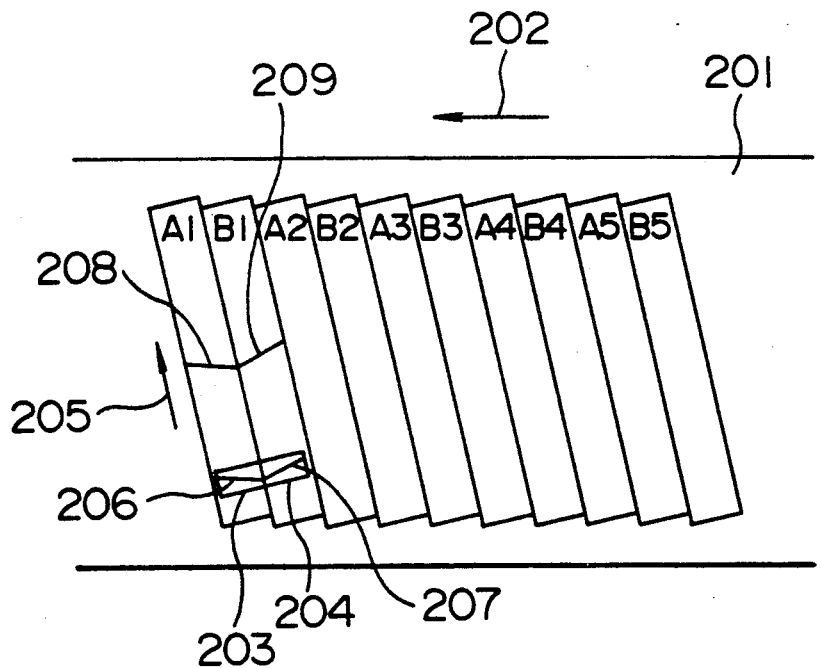
FIG. 27 schematically illustrates a pattern of a recording track recorded by a conventional magnetic recording and reproducing apparatus.
Figure 28A:
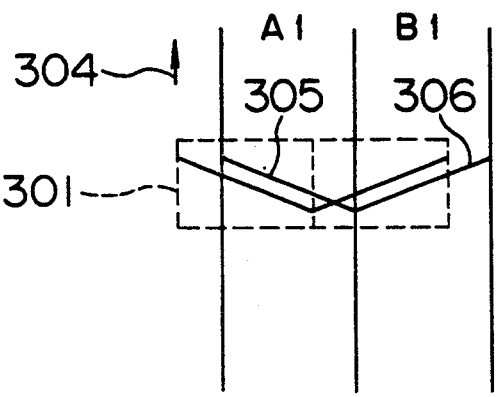
FIGS. 28(a)–(c) schematically illustrates the positional relationship between a magnetic head and a recording track.
Figure 28B:
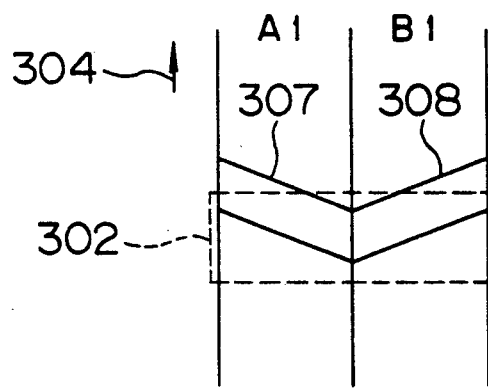
Figure 28C:
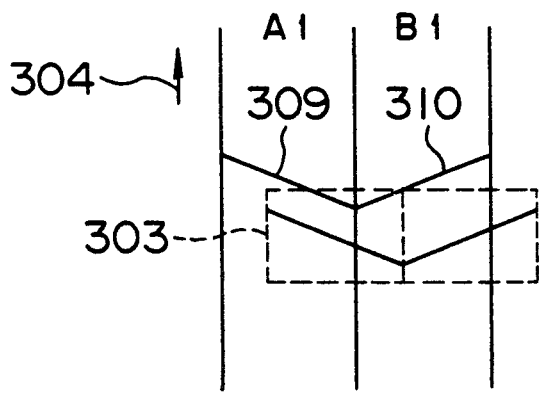
Figure 29:
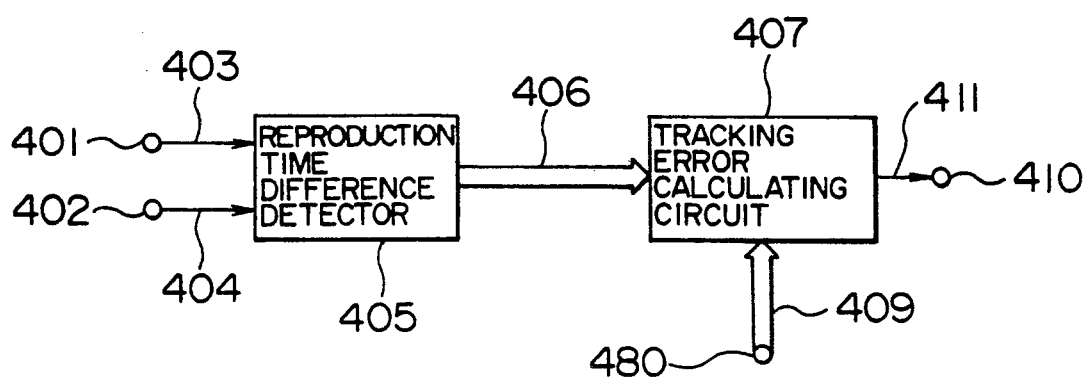
FIG. 29 is a block diagram of a tracking error detector of an azimuth time difference detection system.
Figure 30:
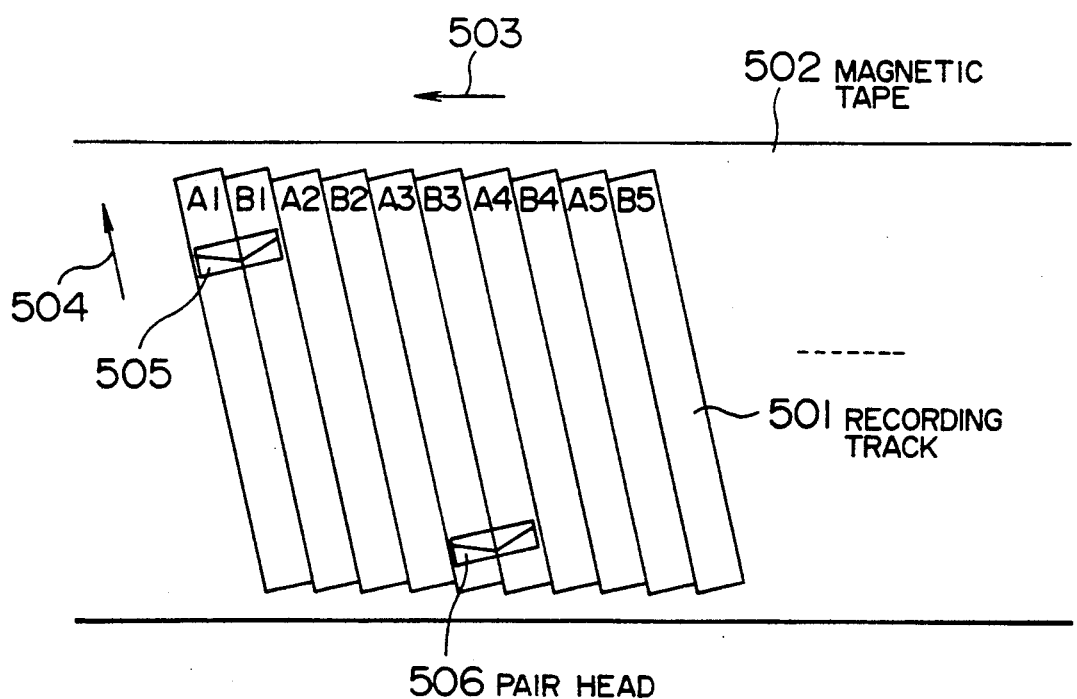
FIGS. 30 and 31(a–c) are a schematic view indicative of a track pattern and a timing chart, respectively, illustrating the conventional problems.
Figure 31A:
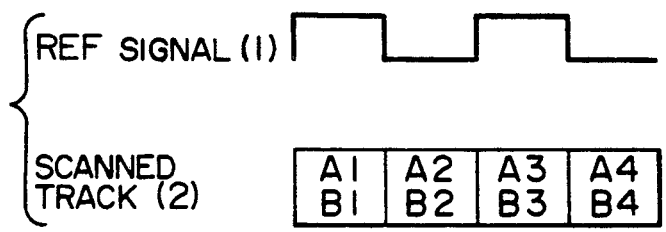
Figure 31B:
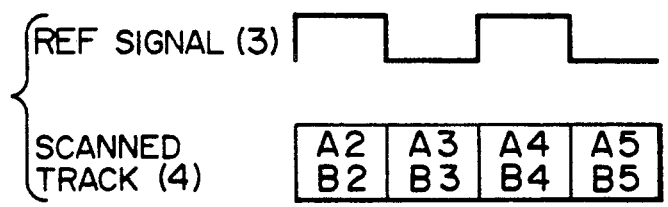
Figure 31C:
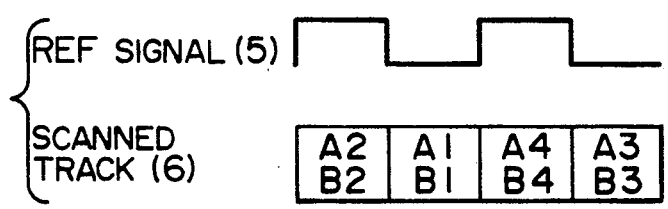

A seventh embodiment of the present invention will now be described with reference to FIG. 25 which is a block diagram of a tracking control device as the seventh embodiment. In FIGS. 25 and 1, like reference numerals are used to denote like components of the seventh and first embodiments. In FIG. 25, reference numeral 3001 denotes a preset waveform generator which outputs a deviation waveform data 3002 for piezoelectric device 702 (721) in accordance with the speed of movement of a magnetic tape during special reproduction such as high-speed reproduction. Preset waveform generator 3001 outputs data 3002 to shift piezoelectric devices 702, 807 to such that when the magnetic tape is moved at a speed different from the recording speed, the scanning traces of head pairs 701, 807 mounted on piezoelectic devices 702, 807, respectively, assume the same scanning traces as during recording on the recording track. Thus the waveform of data 3002 output in correspondence to the speed of the magnetic tape is predetermined.

Piezoelectric device driving data calculating circuit 3003 calculates preset drive data to shift piezoelectric device 702 (721) on the basis of shift waveform data 3002, converts data 713, indicative of the deviating number of tracks output from tracking determining circuit 710, to deviation correcting data corresponding to a deviation of piezoelectric devices 702 (721), and outputs to piezoelectric drive circuit 712 (720) piezoelectric device driving data 714 (715) comprising the sum of the preset drive data and deviation correcting data.

By the structure of the present embodiment, track data recorded on each recording track is used to check whether the reproduction head scans a normal track. If the reproduction head does not scan the normal track, the difference between the value of track data on a recording track to be scanned originally and the value of reproduced track data is calculated, and the drive voltage applied across the piezoelectric device is changed by a quantity corresponding to the value of the difference to thereby move the reproduction head to the normal track. A tracking control system which is capable of following a recording track during special reproduction is realized.

As described in the first through seventh embodiments according to the present invention, the tracking control device comprises tracking determining means for determining whether the magnetic head scans a normal track on the basis of track data or segment data corresponding to a recording track, and a field switching signal; tracking error detecting means for detecting a quantity of track deviation of the magnetic heads; and calculating and driving means for calculating an output from the outputs of the tracking determining means and of the tracking error detecting means to drive an electrical-to-mechanical device on which the magnetic head is mounted. Thus, when the magnetic head does not scan a normal track, the distance between a track to be scanned originally and the track scanned actually is calculated and the drive voltage applied across the electrical-to-mechanical device (piezoelectric device) is changed in accordance with the distance to thereby move the reproduction head rapidly to the normal track, advantageously. Therefore, the magnetic head reproduces data recorded on a normal recording track at all times to thereby provide a stabilized reproduced video.

Track data is digital data such as 1, 2, 3, 4, . . . , as they are, stored in and detected from the corresponding tracks and different from a pilot signal system used in DAT, etc., and detecting a frequency difference. Thus, the number of pieces of track data is not limited, namely, many pieces of track data can be set according to the present invention whereas the number of pieces of track data is limited due to restriction to the frequency difference according to the pilot signal system.

What is claimed is:

1. A tracking control device for a magnetic recording and reproducing apparatus for recording and reproducing information on and from a magnetic recording medium having a plurality of information tracks uniformly arranged at a given track pitch and including a predetermined number of different track information sets coded and recorded thereon in a predetermined order, said device comprising:

(a) track information detecting means including a first pickup head mounted on a first electro-mechanical transducer and a second pickup head mounted on a second electro-mechanical transducer, said first pickup head and said second pickup head respectively for, in a normal mode, alternately scanning a first one and a second one of said plurality of information tracks and detecting said predetermined number of different track information sets, said detecting means outputting track information data representing said predetermined number of different track information sets detected by said first pickup head and said second pickup head;

(b) a tracking determining circuit including a first memory means for storing a first portion of said track information data relating to said first one of said tracks scanned by said first pickup head, a second memory means for storing a second portion of said track information data relating to said second one of said tracks scanned by said second pickup head, and a comparison means for comparing said first portion stored in said first memory means with said second portion stored in said second memory means and outputting a comparison result based thereon;

(c) deviation determination means for detecting whether said first pickup head and said second pickup head are scanning in said normal mode by determining, based on said comparison result, a deviation amount, if any, of a scanning position of said first pickup head from a particular one of said tracks having a predetermined relationship with said second one of said tracks scanned by said second pickup head and for outputting a driving signal representing an integral number of track pitches corresponding to said deviation amount; and (d) transducer position driving means, receiving said driving signal, for moving said first transducer in a direction normal to a scanning direction of said first pickup head by an amount equal to said integral number of track pitches.

2. A tracking control device for a magnetic recording and reproducing apparatus for recording and reproducing information on and from a magnetic recording medium having a plurality of information tracks uniformly arranged at a given track pitch and including synchronizing signals and a predetermined number of different track information sets coded and recorded thereon in a predetermined order, said device comprising:

(a) track information detecting means including a first pickup head mounted on a first electro-mechanical transducer and a second pickup head mounted on a second electro-mechanical transducer, said first pickup head and said second pickup head respectively for, in a normal mode, alternately scanning a first one and a second one of said plurality of information tracks and detecting said predetermined number of different track information sets, said detecting means outputting track information data representing said predetermined number of different track information sets detected by said first pickup head and said second pickup head and a tracking signal, in response to said synchronizing signals, indicating a first scanning position of said first pickup head relative to said first one of said tracks and a second scanning position of said second pickup head relative to said second one of said tracks;

(b) a tracking determining circuit including a first memory means for storing a first portion of said track information data relating to said first one of said tracks scanned by said first pickup head, a second memory means for storing a second portion of said track information data relating to said second one of said tracks scanned by said second pickup head, and a comparison means for comparing said first portion stored in said first memory means with said second portion stored in said second memory means and outputting a comparison result signal based thereon;

(c) tracking error detecting means for outputting a tracking error signal representing a first deviation of said first scanning position relative to an on-track position of said first one of said tracks and a second deviation of said second scanning position relative to an on-track position of said second one of said tracks;

(d) deviation determination means, receiving said tracking error signal and said comparison result signal, for (i) detecting whether said first pickup head and said second pickup head are scanning in said normal mode by determining, based on said comparison result, a first deviation amount, if any, of said first scanning position of sad first pickup head from a particular one of said tracks having a predetermined relationship with said second one of said tracks scanned by said second pickup head, (ii) calculating a second deviation amount, if any, of said first scanning position of said first pickup head based on said tracking error signal, said second deviation amount being less than one track pitch, and (iii) outputting a driving signal representing a combination of (a) an integral number of track pitches corresponding to said first deviation amount and (b) said second deviation amount; and (e) transducer position driving means, receiving said driving signal, for moving said first transducer in a direction normal to a scanning direction of said first pickup head by an amount equal to said combination of said integral number of track pitches and said second deviation amount.

3. A tracking control device for a magnetic recording and reproducing apparatus for recording and reproducing image signal information on and from a magnetic recording medium having a plurality of information tracks uniformly arranged at a given track pitch and including a predetermined number of different track information sets coded and recorded thereon in a predetermined order, said device comprising:

(a) track information detecting means including a first pickup head mounted on a first elecro-mechanical transducer and a second pickup head mounted on a second electro-mechanical transducer, said first pickup head and said second pickup head respectively for, in a normal mode, alternately scanning a first one and a second one of said plurality of information tracks and detecting said predetermined number of different track information sets, said detecting means outputting track information data representing said predetermined number of different track information sets detected by said first pickup head and said second pickup head;

(b) field switching signal generating means for outputting a field switching signal which is at a high level at an image signal processing timing of an odd number field and at a low level at an image signal processing timing of an even number field;

(c) a tracking determining circuit including a first memory means for storing a first portion of said track information data relating to said first one of said tracks scanned by said first pickup head when said field switching signal is at the high level, a second memory means for storing a second portion of said track information data relating to said second one of said tracks scanned by said second pickup head when said field switching signal is at the low level, and a comparison means for comparing said first portion stored in said first memory means with said second portion stored in said second memory means and outputting a comparison result based thereon;

(d) deviation determination means for detecting whether said first pickup head and said second pickup head are scanning in said normal mode by determining, based on said comparison result, a deviation amount, if any, of a scanning position of said first pickup head from a particular one of said tracks having a predetermined relationship with said second one of said tracks scanned by said second pickup head and for outputting a driving signal representing an integral number of track pitches corresponding to said deviation amount; and (e) transducer position driving means, receiving said driving signal, for moving said first transducer in a direction normal to a scanning direction of said first pickup head by an amount equal to said integral number of track pitches.

4. A segment type magnetic recording and reproducing apparatus for recording and reproducing image signal information on and from a magnetic recording medium having a plurality of information tracks uniformly arranged at a given track pitch and including a predetermined number of different track information sets coded and recorded thereon in a predetermined order, said image signal information including one-field image information that is recorded in a plurality of said information tracks, said apparatus comprising:

(a) track information detecting means including a first pickup head mounted on a first electro-mechanical transducer and a second pickup head mounted on a second elecro-mechanical transducer, said first pickup head and said second pickup head respectively for, in a normal mode, alternately scanning a first one and a second one of said plurality of information tracks and detecting said predetermined number of different track information sets, said detecting means outputting track information data representing said predetermined number of different track information sets detected by said first pickup head and said second pickup head;

(b) field switching signal generating means for outputting a field switching signal having high and low logical states indicating field switching of said image signal information;

(c) track switching signal generating means for outputting a track switching signal having high and low logical states indicating switching of scanning of said information tracks;

(d) a tracking determining circuit including a first memory means for storing a first portion of said track information data relating to said first one of said tracks scanned by said first pickup head at a first processing timing determined by a combination of a logical level of said field switching signal and a logical level of said track switching signal, a second memory means for storing a second portion of said track information data relating to said second one of said tracks scanned by said second pickup head at a second processing timing determined by a combination of a logical level of said field switching signal and a logical level of said track switching signal, and a comparison means for comparing said first portion stored in said first memory means with said second portion stored in said second memory means and outputting a comparison result based thereon;

(e) deviation determination means for detecting whether said first pickup head and said second pickup head are scanning in said normal mode by determining, based on said comparison result, a deviation amount, if any, of a scanning position of said first pickup head from a particular one of said tracks having a predetermined relationship with said second one of said tracks scanned by said second pickup head and for outputting a driving signal representing an integral number of track pitches corresponding to said deviation amount; and (f) transducer position driving means, receiving said driving signal, for moving said first transducer in a direction normal to a scanning direction of said first pickup head by an amount equal to said integral number of track pitches.

5. A tracking control device for a magnetic recording and reproducing apparatus for recording and reproducing information on and from a magnetic recording medium having a plurality of information tracks uniformly arranged at a given track pitch and including a predetermined number of different track information sets coded and recorded thereon in a predetermined order, said device comprising:

(a) track information detecting means including a first pickup head mounted on a first electro-mechanical transducer and a second pickup head mounted on a second electro-mechanical transducer, said first pickup head and said second pickup head respectively for, in a normal mode, alternately scanning a first one and a second one of said plurality of information tracks and detecting said predetermined number of different track information sets, said detecting means outputting track information data representing said predetermined number of different track information sets detected by said first pickup head and said second pickup head and a tracking error signal indicating a first scanning position of said first pickup head relative to said first one of said tracks and a second scanning position of said second pickup head relative to said second one of said tracks;

(b) a tracking determining circuit including a first memory means for storing a first portion of said track information data relating to said first one of said tracks scanned by said first pickup head, a second memory means for storing a second portion of said track information data relating to said second one of said tracks scanned by said second pickup head, and a comparison means for comparing said first portion stored in said first memory means with said second portion stored in said second memory means and outputting a comparison result signal based thereon;

(c) preset waveform outputting means for outputting sawtooth waveform data, representing a forward moving speed of the recording medium relative to said first pickup head and said second pickup head, for controlling a first deviation of said first scanning position relative to an on-track position of said first one of said tracks and a second deviation of said second scanning position relative to an on-track position of said second one of said tracks, so that a scanning path of said first pickup head and said second pickup head with respect to a recording track conforms to a scanning path during a recording mode;

(d) deviation determination means, receiving said waveform data and said comparison result signal, for (i) detecting whether said first pickup head and said second pickup head are scanning in said normal mode by determining, based on said comparison result, a first deviation amount, if any, of said first scanning position of said first pickup head from a particular one of said tracks having a predetermined relationship with said second one of said tracks scanned by said second pickup head, (ii) calculating a second deviation amount, if any, of said first scanning position of said first pickup head based on said waveform data, and (iii) outputting a sawtooth driving signal representing a combination of (a) an integral number of track pitches corresponding to said first deviation amount and (b) said second deviation amount, for controlling said scanning position of said first pickup head to vary in a sawtooth shape; and (e) transducer position driving means, receiving said driving signal, for moving said first transducer in a direction normal to a scanning direction of said first pickup head by an amount equal to said combination of said integral number of track pitches and said second deviation amount.

6. A tracking control device for a magnetic recording and reproducing apparatus for recording and reproducing information on and from a magnetic recording medium having a plurality of information tracks uniformly arranged at a given track pitch and including a predetermined number of different track information sets coded and recorded thereon in a predetermined order, said device comprising:

(a) track information detecting means including a pickup head means mounted on an electro-mechanical transducer means, said pickup head means for, in a normal mode, scanning said plurality of information tracks in a predetermined order wherein a first track is scanned first and a second track is scanned thereafter and detecting said predetermined number of different track information sets, said detecting means outputting track information data representing said predetermined number of different track information sets detected by said pickup means;

(b) a tracking determining circuit including a first memory means for storing a first portion of said track information data relating to said first track scanned by said pickup head means, a second memory means for storing a second portion of said track information data relating to said second track scanned by said pickup head means, and a comparison means for comparing said first portion stored in said first memory means with said second portion stored in said second memory means and outputting a comparison result based thereon;

(c) deviation determination means for detecting whether said pickup head means is scanning in said normal mode by determining, based on said comparison result, a deviation amount, if any, of a scanning position of said pickup head means from said second track and for outputting a driving signal representing an integral number of track pitches corresponding to said deviation amount; and (d) transducer position driving means, receiving said driving signal, for moving said transducer means in a direction normal to a scanning direction of said pickup head means by an amount equal to said integral number of track pitches.

7. A tracking control device for a magnetic recording and reproducing apparatus for recording and reproducing information on and from a magnetic recording medium having a plurality of information tracks uniformly arranged at a given track pitch and including synchronizing signals and a predetermined number of different track information sets coded and recorded thereon in a predetermined order, said device comprising:

(a) track information detecting means including a pickup head means mounted on an electromechanical transducer means, said pickup head means for, in a normal mode, scanning said plurality of information tracks in a predetermined order wherein a first track is scanned first and a second track is scanned thereafter and detecting said predetermined number of different track information sets, said detecting means outputting track information data representing said predetermined number of different track information sets detected by said pickup head means and, in response to said synchronizing signals, a tracking signal indicating a scanning position of said pickup head means relative to said first track and said second track;

(b) a tracking determining circuit including a first memory means for storing a first portion of said track information data relating to said first track scanned by said pickup head means, a second memory means for storing a second portion of said track information data relating to said second track scanned by said pickup head means, and a comparison means for comparing said first portion stored in said first memory means with said second portion stored in said second memory means and outputting a comparison result signal based thereon;

(c) tracking error detecting means for outputting a tracking error signal representing a deviation of said scanning position relative to an on-track position of said second track;

(d) deviation determination means, receiving said tracking error signal and said comparison result signal, for (i) detecting whether said pickup head means is scanning in said normal mode by determining, based on said comparison result, a first deviation amount, if any, of a scanning position of said pickup head means from said second track, (ii) calculating a second deviation amount, if any, of said scanning position of said pickup head means based on said tracking error signal, said second deviation amount being less than one track pitch, and (iii) outputting a driving signal representing a combination of (aa) an integral number of track pitches corresponding to said first deviation amount and (bb) said second deviation amount; and (e) transducer position driving means, receiving said driving signal, for moving said transducer means in a direction normal to a scanning direction of said pickup head means by an amount equal to said combination of said integral number of track pitches and said second deviation amount.

8. A tracking control device for a magnetic recording and reproducing apparatus for recording and reproducing image signal information on and from a magnetic recording medium having a plurality of information tracks uniformly arranged at a given track pitch and including a predetermined number of different track information sets coded and recorded thereon in a predetermined order, said device comprising:

(a) track information detecting means including a pickup head means mounted on an electromechanical transducer means, said pickup head means for, in a normal mode, scanning said plurality of information tracks in a predetermined order wherein a first track is scanned first and a second track is scanned thereafter and detecting said predetermined number of different track information sets, said detecting means outputting track information data representing said predetermined number of different track information sets detected by said pickup head means;

(b) field switching signal generating means for outputting a field switching signal which is at a high level at an image signal processing timing of an odd number field and at a low level at an image signal processing timing of an even number field;

(c) a tracking determining circuit including a first memory means for storing a first portion of said track information data relating to said first track scanned by said pickup head means when said field switching signal is at the high level, a second memory means for storing a second portion of said track information data relating to said second track scanned by said pickup head means when said field switching signal is at the low level, and a comparison means for comparing said first portion stored in said first memory means with said second portion stored in said second memory means and outputting a comparison result based thereon;

(d) deviation determination means for detecting whether said pickup head means is scanning in said normal mode by determining, based on said comparison result, a deviation amount, if any, of a scanning position of said pickup head means from said second track and for outputting a driving signal representing an integral number of track pitches corresponding to said deviation amount; and (e) transducer position driving means, receiving said driving signal, for moving said transducer means in a direction normal to a scanning direction of said pickup head means by an amount equal to said integral number of track pitches.

9. A segment type magnetic recording and reproducing apparatus for recording and reproducing image signal information on and from a magnetic recording medium having a plurality of information tracks uniformly arranged at a given track pitch and including a predetermined number of different track information sets coded and recorded thereon in a predetermined order, said image signal information including one-field image information that is recorded in a plurality of said information tracks, said apparatus comprising:

(a) track information detecting means including a pickup head means mounted on an electromechanical transducer means, said pickup head means for, in a normal mode, scanning said plurality of information tracks in a predetermined order wherein a first track is scanned first and a second track is scanned thereafter and detecting said predetermined number of different track information sets, said detecting means outputting track information data representing said predetermined number of different track information sets detected by said pickup head means;

(b) field switching signal generating means for outputting a field switching signal having high and low logical states indicating field switching of said image signal information;

(c) track switching signal generating means for outputting a track switching signal having high and low logical states indicating switching of scanning of said information tracks;

(d) a tracking determining circuit including a first memory means for storing a first portion of said track information data relating to said first track scanned by said pickup head means at a first processing timing determined by a combination of a logical level of said field switching signal and a logical level of said track switching signal, a second memory means for storing a second portion of said track information data relating to said track scanned by said pickup head means at a second processing timing determined by a combination of a logical level of said field switching signal and a logical level of said track switching signal, and a comparison means for comparing said first portion stored in said first memory means with said second portion stored in said second memory means and outputting a comparison result based thereon;

(e) deviation determination means for detecting whether said pickup head means is scanning in said normal mode by determining, based on said comparison result, a deviation amount, if any, of a scanning position of said pickup head means from said second track and for outputting a driving signal representing an integral number of track pitches corresponding to said deviation amount; and (f) transducer position driving means, receiving said driving signal, for moving said transducer means in a direction normal to a scanning direction of said pickup head means by an amount equal to said integral number of track pitches.

10. A tracking control device for a magnetic recording and reproducing apparatus for recording and reproducing information on and from a magnetic recording medium having a plurality of information tracks uniformly arranged at a given track pitch and including a predetermined number of different track information sets coded and recorded thereon in a predetermined order, said device comprising:

(a) track information detecting means including a pickup head means mounted on an electromechanical transducer means, said pickup head means for, in a normal mode, scanning said plurality of information tracks in a predetermined order wherein a first track is scanned first and a second track is scanned thereafter and detecting said predetermined number of different track information sets, said detecting means outputting track information data representing said predetermined number of different track information sets detected by said pickup head means and a tracking error signal indicating a scanning position of said pickup head means relative to said second track;

(b) a tracking determining circuit including a first memory means for storing a first portion of said track information data relating to said first track scanned by said pickup head means, a second memory means for storing a second portion of said track information data relating to said second track scanned by said pickup head means, and a comparison means for comparing said first portion stored in said first memory means with said second portion stored in said second memory means and outputting a comparison result signal based thereon;

(c) preset waveform outputting means for outputting sawtooth waveform data, representing a forward moving speed of the recording medium relative to said pickup head means, for controlling a first deviation of said scanning position relative to an on-track position of said first track and a second deviation of said second scanning position relative to an on-track position of said second track, so that a scanning path of said pickup head means with respect to an information track conforms to a scanning path during a recording mode;

(d) deviation determination means, receiving said waveform data and said comparison result signal, for (i) detecting whether said pickup head means is scanning in said normal mode by determining, based on said comparison result, a first deviation amount, if any, of said scanning position of said pickup head means from said second track scanned by said pickup head means, (ii) calculating a second deviation amount, if any, of said scanning position of said pickup head means based on said waveform data, and (iii) outputting a sawtooth driving signal representing a combination of (aa) an integral number of track pitches corresponding to said first deviation amount and (bb) said second deviation amount, for controlling said scanning position of said pickup head means to vary in accordance with a sawtooth-shaped path; and (e) transducer position driving means, receiving said driving signal, for moving said transducer means in a direction normal to a scanning direction of said pickup head means by an amount equal to said combination of said integral number of track pitches and said second deviation amount.

* * * * *